(12) United States Patent
Nakajima

(10) Patent No.: US 8,559,044 B2
(45) Date of Patent: *Oct. 15, 2013

(54) UPDATE CONTROL OF IMAGE PROCESSING CONTROL DATA

(75) Inventor: Yasumasa Nakajima, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/601,031

(22) Filed: Aug. 31, 2012

(65) Prior Publication Data

US 2012/0327255 A1    Dec. 27, 2012

Related U.S. Application Data

(63) Continuation of application No. 13/083,914, filed on Apr. 11, 2011, now Pat. No. 8,279,481, which is a continuation of application No. 12/231,516, filed on Sep. 2, 2008, now Pat. No. 7,924,472, which is a continuation of application No. 10/429,017, filed on May 2, 2003, now Pat. No. 7,428,082.

(30) Foreign Application Priority Data

May 7, 2002    (JP) .......................... 2002-131207(P)

(51) Int. Cl.
*G06F 3/12*    (2006.01)

(52) U.S. Cl.
USPC .......... 358/1.15; 358/1.16; 358/1.9; 382/167; 348/552

(58) Field of Classification Search
USPC ............... 358/1.15, 1.16, 488, 448, 474, 482, 358/483, 1.9, 302; 382/167, 254; 348/552, 348/231.9

See application file for complete search history.

(56) References Cited

U.S. PATENT DOCUMENTS

| | | | |
|---|---|---|---|
| 4,216,480 A | 8/1980 | Buehner et al. | |
| 4,476,497 A | 10/1984 | Oshikoshi et al. | |
| 4,561,025 A | 12/1985 | Tsuzuki | |
| 4,792,847 A | 12/1988 | Shimazaki et al. | |

(Continued)

FOREIGN PATENT DOCUMENTS

| | | |
|---|---|---|
| EP | 0653879 | 5/1995 |
| EP | 0706285 | 4/1996 |

(Continued)

OTHER PUBLICATIONS

Etsuro Endo, "Adobe Photoshop ™ A to Z," BNN, Inc. Jun. 30, 1993, 6$^{th}$ edition, p. 232.

(Continued)

*Primary Examiner* — Negussie Worku
(74) *Attorney, Agent, or Firm* — Martine Penilla Group, LLP

(57) ABSTRACT

This invention relates to the updating of image processing control data that is related to image data and controls image processing of the image data. An image related data generator generates an image file that includes image data and image processing data pre-stored therein. The image processing control data can be updated according to the following process. The image related data generator sends specification data that specifies image processing control data to be updated to an update data server. Then the image related data generator receives the update data from the update data server. And the image related generator updates the image processing control data stored therein with the update data.

9 Claims, 19 Drawing Sheets

(56) References Cited

U.S. PATENT DOCUMENTS

| | | | |
|---|---|---|---|
| 5,168,371 A | 12/1992 | Takayanagi | |
| 5,477,264 A | 12/1995 | Sarbadhikari et al. | |
| 5,489,998 A | 2/1996 | Yamada et al. | |
| 5,495,349 A | 2/1996 | Ikeda | |
| 5,497,419 A | 3/1996 | Hill | |
| 5,512,977 A | 4/1996 | Imai | |
| 5,528,293 A | 6/1996 | Watanabe | |
| 5,646,752 A | 7/1997 | Kohler et al. | |
| 5,646,994 A | 7/1997 | Hill | |
| 5,940,121 A | 8/1999 | Mcintyre et al. | |
| 5,982,416 A | 11/1999 | Ishii et al. | |
| 6,011,547 A | 1/2000 | Shiota et al. | |
| 6,108,008 A | 8/2000 | Ohta | |
| 6,115,104 A | 9/2000 | Nakatsuka | |
| 6,192,191 B1 | 2/2001 | Suga et al. | |
| 6,229,625 B1 | 5/2001 | Nakatsuka | |
| 6,229,965 B1 | 5/2001 | Ito et al. | |
| 6,256,350 B1 | 7/2001 | Bishay et al. | |
| 6,263,251 B1 | 7/2001 | Rutschmann | |
| 6,273,535 B1 | 8/2001 | Inoue et al. | |
| 6,282,362 B1 | 8/2001 | Murphy et al. | |
| 6,337,922 B2 | 1/2002 | Kumada | |
| 6,384,928 B2 | 5/2002 | Nagasawa et al. | |
| 6,456,400 B1 | 9/2002 | Ikegami et al. | |
| 6,459,500 B1 | 10/2002 | Takaoka | |
| 6,483,609 B1 * | 11/2002 | Ueno et al. | 358/434 |
| 6,539,169 B1 | 3/2003 | Tsubaki et al. | |
| 6,560,374 B1 | 5/2003 | Enomoto | |
| 6,563,603 B1 | 5/2003 | Yamazaki | |
| 6,567,119 B1 | 5/2003 | Parulski et al. | |
| 6,583,811 B2 | 6/2003 | Kinjo | |
| 6,597,468 B1 | 7/2003 | Inuiya | |
| 6,603,506 B2 | 8/2003 | Ogawa et al. | |
| 6,609,162 B1 | 8/2003 | Shimizu et al. | |
| 6,628,325 B1 | 9/2003 | Steinberg et al. | |
| 6,633,410 B1 | 10/2003 | Narushima | |
| 6,650,365 B1 | 11/2003 | Sato | |
| 6,650,437 B1 | 11/2003 | Nakajima | |
| 6,657,658 B2 | 12/2003 | Takemura | |
| 6,678,402 B2 | 1/2004 | Jones et al. | |
| 6,724,926 B2 | 4/2004 | Jones et al. | |
| 6,728,428 B1 | 4/2004 | Kinjo | |
| 6,736,476 B2 | 5/2004 | Inoue et al. | |
| 6,750,902 B1 | 6/2004 | Steinberg et al. | |
| 6,771,889 B1 | 8/2004 | Suga et al. | |
| 6,785,814 B1 | 8/2004 | Usami et al. | |
| 6,822,678 B2 | 11/2004 | Hatori | |
| 6,822,758 B1 | 11/2004 | Morino | |
| 6,829,006 B1 | 12/2004 | Hayashi | |
| 6,834,130 B1 | 12/2004 | Niikawa et al. | |
| 6,836,565 B1 | 12/2004 | Nishikawa | |
| 6,850,271 B1 | 2/2005 | Ichikawa | |
| 6,869,156 B2 | 3/2005 | Inoue et al. | |
| 6,888,943 B1 | 5/2005 | Lam et al. | |
| 6,889,324 B1 | 5/2005 | Kanai et al. | |
| 6,903,776 B1 | 6/2005 | Tsujino et al. | |
| 6,914,625 B1 | 7/2005 | Anderson et al. | |
| 6,919,924 B1 | 7/2005 | Terashita | |
| 6,937,997 B1 | 8/2005 | Parulski | |
| 6,943,904 B1 * | 9/2005 | Dance et al. | 358/1.13 |
| 6,968,058 B1 | 11/2005 | Kondoh et al. | |
| 6,992,711 B2 | 1/2006 | Kubo | |
| 7,014,374 B2 * | 3/2006 | Hamaguchi et al. | 400/62 |
| 7,085,377 B1 | 8/2006 | Norr | |
| 7,139,087 B2 | 11/2006 | Hayashi | |
| 7,151,832 B1 | 12/2006 | Fetkovich et al. | |
| 7,170,632 B1 | 1/2007 | Kinjo | |
| 7,177,429 B2 | 2/2007 | Moskowitz et al. | |
| 7,194,130 B2 | 3/2007 | Nishikawa | |
| 7,206,081 B2 | 4/2007 | Sada et al. | |
| 7,221,482 B2 | 5/2007 | Yamazaki et al. | |
| 7,262,873 B1 * | 8/2007 | Rasche et al. | 358/1.15 |
| 7,271,932 B2 | 9/2007 | Izumi | |
| 7,327,490 B2 | 2/2008 | Kuwata et al. | |
| 7,350,086 B2 * | 3/2008 | Nakajima | 713/193 |
| 7,360,852 B2 | 4/2008 | Inoue et al. | |
| 7,362,891 B2 | 4/2008 | Jones et al. | |
| 7,375,848 B2 | 5/2008 | Nakami et al. | |
| 7,403,696 B2 | 7/2008 | Suga et al. | |
| 7,428,082 B2 | 9/2008 | Nakajima | |
| 7,453,598 B2 | 11/2008 | Takahashi | |
| 7,457,483 B2 | 11/2008 | Tokiwa | |
| 7,471,414 B2 | 12/2008 | Xueping | |
| 7,474,424 B2 | 1/2009 | Hokiyama | |
| 7,483,168 B2 | 1/2009 | Kuwata et al. | |
| 7,499,201 B2 | 3/2009 | Kodama et al. | |
| 7,533,949 B2 | 5/2009 | Inoue et al. | |
| 7,636,173 B2 * | 12/2009 | Watanabe | 358/1.15 |
| 7,701,626 B2 | 4/2010 | Inuiya | |
| 7,751,644 B2 | 7/2010 | Kuwata | |
| 7,774,605 B2 | 8/2010 | Kanai et al. | |
| 7,787,041 B2 | 8/2010 | Kaku | |
| 7,796,289 B2 * | 9/2010 | Shiohara | 358/1.15 |
| 7,825,962 B2 | 11/2010 | Nakajima et al. | |
| 7,825,978 B2 * | 11/2010 | Ito et al. | 348/333.01 |
| 7,852,494 B2 | 12/2010 | Asai | |
| 7,852,503 B2 * | 12/2010 | Iwami et al. | 358/1.15 |
| 7,852,520 B2 | 12/2010 | Iida | |
| 7,880,926 B2 * | 2/2011 | Nakanishi | 358/1.9 |
| 7,891,826 B2 * | 2/2011 | Fujinawa et al. | 353/119 |
| 7,898,680 B2 | 3/2011 | Misawa et al. | |
| 7,899,269 B2 | 3/2011 | Kuwata | |
| 7,920,291 B2 | 4/2011 | Fukada et al. | |
| 7,924,472 B2 * | 4/2011 | Nakajima | 358/302 |
| 7,933,041 B2 | 4/2011 | Nakami | 358/1.9 |
| 8,089,514 B2 * | 1/2012 | Shimizu et al. | 348/154 |
| 8,102,558 B2 * | 1/2012 | Goto et al. | 358/1.18 |
| 8,203,755 B2 * | 6/2012 | Nakami | 358/1.9 |
| 8,208,164 B2 * | 6/2012 | Yada et al. | 358/1.15 |
| 8,279,481 B2 * | 10/2012 | Nakajima | 358/1.15 |
| 8,325,382 B2 * | 12/2012 | Maeno et al. | 358/1.2 |
| 2001/0024292 A1 | 9/2001 | Otake | |
| 2001/0035909 A1 | 11/2001 | Kubo | |
| 2002/0008782 A1 | 1/2002 | Kurokawa | |
| 2002/0105582 A1 | 8/2002 | Ikeda | |
| 2002/0122194 A1 | 9/2002 | Kuwata et al. | |
| 2002/0135687 A1 | 9/2002 | Nakajima et al. | |
| 2002/0140952 A1 | 10/2002 | Fukasawa | |
| 2002/0196346 A1 | 12/2002 | Nishio et al. | |
| 2003/0025811 A1 | 2/2003 | Keelan et al. | |
| 2003/0215220 A1 | 11/2003 | Ohmura et al. | |
| 2004/0032400 A1 | 2/2004 | Freeman et al. | |
| 2004/0201699 A1 | 10/2004 | Parulski et al. | |
| 2004/0260935 A1 | 12/2004 | Usami et al. | |
| 2005/0007617 A1 | 1/2005 | Tanaka et al. | |
| 2005/0030568 A1 | 2/2005 | Narushima et al. | |
| 2005/0134900 A1 | 6/2005 | Kuwata | |
| 2005/0152613 A1 | 7/2005 | Okutsu et al. | |
| 2005/0166057 A1 | 7/2005 | Kanai et al. | |
| 2005/0223228 A1 | 10/2005 | Ogawa et al. | |
| 2006/0044601 A1 | 3/2006 | Misawa et al. | |
| 2006/0072156 A1 | 4/2006 | Shima | |
| 2006/0232797 A1 | 10/2006 | Hayaishi | |
| 2008/0002035 A1 | 1/2008 | Yoshida | |
| 2008/0174677 A1 | 7/2008 | Nakajima et al. | |
| 2008/0198396 A1 | 8/2008 | Nakami et al. | |
| 2009/0009813 A1 | 1/2009 | Nakajima | |
| 2010/0289808 A1 | 11/2010 | Hitaka | |

FOREIGN PATENT DOCUMENTS

| | | |
|---|---|---|
| EP | 0757473 | 2/1997 |
| EP | 0860980 | 8/1998 |
| EP | 1056272 | 11/2000 |
| EP | 1241870 | 9/2002 |
| JP | 03-038986 | 2/1991 |
| JP | 303986 | 2/1991 |
| JP | 05-292533 | 11/1993 |
| JP | 06-008537 | 1/1994 |
| JP | 08-315106 | 11/1996 |
| JP | 09-098373 | 4/1997 |
| JP | 09-219817 | 8/1997 |
| JP | 10-174036 | 6/1998 |
| JP | 10-191246 | 7/1998 |

(56) References Cited

FOREIGN PATENT DOCUMENTS

| | | |
|---|---|---|
| JP | 10-221791 | 8/1998 |
| JP | 10-226139 | 8/1998 |
| JP | 10-276295 | 10/1998 |
| JP | 10-308870 | 11/1998 |
| JP | 10-334212 | 12/1998 |
| JP | 11-041511 | 2/1999 |
| JP | 11-041622 | 2/1999 |
| JP | 11-066274 | 3/1999 |
| JP | 11-088672 | 3/1999 |
| JP | 11-098461 | 4/1999 |
| JP | 11-122581 | 4/1999 |
| JP | 11-127415 | 5/1999 |
| JP | 11-150656 | 6/1999 |
| JP | 11-164160 | 6/1999 |
| JP | 11-191871 | 7/1999 |
| JP | 11-234605 | 8/1999 |
| JP | 11-239269 | 8/1999 |
| JP | 11-298848 | 10/1999 |
| JP | 11-308564 | 11/1999 |
| JP | 11-317863 | 11/1999 |
| JP | 11-317921 | 11/1999 |
| JP | 11-327605 | 11/1999 |
| JP | 11-331596 | 11/1999 |
| JP | 2000-013718 | 1/2000 |
| JP | 2000-020691 | 1/2000 |
| JP | 2000-022994 | 1/2000 |
| JP | 2000-050043 | 2/2000 |
| JP | 2000-066860 | 3/2000 |
| JP | 2000-069277 | 3/2000 |
| JP | 2000-069419 | 3/2000 |
| JP | 2000-101884 | 4/2000 |
| JP | 2000-115688 | 4/2000 |
| JP | 2000-125186 | 4/2000 |
| JP | 2000-132470 | 5/2000 |
| JP | 2000-137806 | 5/2000 |
| JP | 2000-165720 | 6/2000 |
| JP | 2000-196946 | 7/2000 |
| JP | 2000-215379 | 8/2000 |
| JP | 2000-278598 | 10/2000 |
| JP | 2000-312296 | 11/2000 |
| JP | 2000-324430 | 11/2000 |
| JP | 2000-354255 | 12/2000 |
| JP | 2001-084354 | 3/2001 |
| JP | 2001-084361 | 3/2001 |
| JP | 2001-147481 | 5/2001 |
| JP | 2001-243031 | 9/2001 |
| JP | 2002-010134 | 1/2002 |
| JP | 2002-014834 | 1/2002 |
| JP | 2002-063098 | 2/2002 |
| JP | 2003-060935 | 2/2003 |
| JP | 3725454 B2 | 12/2005 |
| WO | WO 9601467 | 1/1996 |
| WO | 98/18258 | 4/1998 |
| WO | WO 0106786 | 1/2001 |

OTHER PUBLICATIONS

Notification of Reasons for Refusal issued in JP Application No. 2001-202865, Japan Patent Office, dated Jun. 29, 2010.
Interrogation issued in JP Application No. 2002-150448, Japan Patent Office, dated Jul. 6, 2010.
Notification of Reasons for Refusal issued in JP Application No. 2002-150666, Japan Patent Office, dated Aug. 17, 2010.
Notification of Reason for Refusal issued in JP Application No. 2008-150033, Japan Patent Office dated Sep. 21, 2010.
Examination Report issued in EP Patent Application No. 02001707.5, European Patent Office, dated Oct. 13, 2010.
Questioning issued in JP Application No. 2001-217914, Japan Patent Office, dated Feb. 22, 2011.
Notification of Reason for Refusal issued in JP Application No. 2010-260022, Japan Patent Office, dated May 10, 2011.
Appeal Decision issued in JP Application No. 2002-150448, Japan Patent Office, dated May 10, 2011.

* cited by examiner

| Name of Tags | Parameter Values |
|---|---|
| Gamma Value | 2.2 |
| Color Space | NTSC |
| Contrast | Slightly Lower |
| Color Balance | Standard |

Fig.7

| Preset No. | Parameters | | | | Suitable Situations |
|---|---|---|---|---|---|
| | Gamma Correction | Color Space | Contrast | Color Balance | |
| 1 | OFF | NTSC | Standard | Standard | Standard |
| 2 | 1.2 | sRGB | Slightly Lower | Standard | Portrait |
| 3 | 0.9 | sRGB | Slightly Higher | Standard | Landscape |
| 4 | 1.1 | NTSC | Standard | OFF | Sunset |

UPDATE CONTROL OF IMAGE PROCESSING CONTROL DATA

CROSS REFERENCE TO RELATED APPLICATIONS

This application is a continuation of U.S. application Ser. No. 13/083,914, filed on Apr. 11, 2011 now U.S. Pat. No. 8,279,481, which is a continuation of U.S. application Ser. No. 12/231,516, filed on Sep. 2, 2008 (now U.S. Pat. No. 7,924,472 B2), which is a continuation of U.S. application Ser. No. 10/429,017, filed on May 2, 2003 (now U.S. Pat. No. 7,428,082 B2). The disclosures of these prior applications from which priority is claimed are incorporated herein by reference for all purposes.

BACKGROUND OF THE INVENTION

1. Field of the Invention

This invention relates to a technique for image processing of image data, based on image processing control data that is related to the image data and is used to control the image processing of the image data.

2. Description of the Related Art

Various types of image generators, such as digital still cameras, digital video cameras, and scanners, are widely used. Various types of image output devices, such as computer displays and printers, are also widely used. Image data to be output can be retouched with photo-retouch software.

This retouching, however, requires the user to be highly skilled and therefore it is difficult to generate retouched image data that sufficiently reflects the characteristics of the image generator and the intention of the user. And also it is labor intensive to carry out such retouching processes whenever outputting the images, which can reduce the convenience of the retouch software or the image outputting devices.

One available technique to reduce the amount of labor required and make the image processing easier is to attach image processing control data to image data when the image data is generated, thereby controlling image processing based on the image processing control data. In this technique, the image processing control data is preferably updated afterwards.

The update of the image processing control data is also labor intensive, because the user has to check whether the image processing control data should be updated or not, and then acquire the correct update data for the image processing control data to be updated.

SUMMARY OF THE INVENTION

This invention solves at least part of the above-mentioned problem, and reduces the amount of labor required to update the image processing control data, thereby making image processing more easily reflect the user's intentions.

This invention provides a number of embodiments. One embodiment is an image related data generator that is connected to a server. The image related data generator comprises an image data generator, a control data storage module, a relating module, and a storage manager. The image data generator is configured to generate image data. The control data storage module pre-stores image processing control data to control image processing of the image data. The relating module is configured to relate the image data to the image processing control data. The storage manager is configured to update at least a part of the image processing control data stored in the control data storage, by sending specification data, which specifies the image processing control data to be updated, to the server and receiving update data from the server.

The image related data generator can easily update the image processing control data stored therein.

In this invention, the image related data generator may be implemented as, e.g., a digital still camera and a scanner. In this case, at least part of the control data storage module and the storage manager can be provided by another device, such as a computer. And the image related data is typically constructed as an image file that includes image data and image processing control data therein.

The server performs the function of transmitting the update data corresponding to the specification data sent from the image related data generator. The specification data specifies the image processing control data to be updated and the image processing control data itself can be used as the specification data.

The update data corresponding to the specification data can be a new version of the image processing control data corresponding to the specification data.

The transmission between the server and the image related data generator can be implemented in various manners, such as via a communication line, e.g., a network such as the Internet or a LAN, and via a recording medium, e.g., memory cards.

Various triggers are available for the transmission of the update data, such as an instruction by the user of the image related data generator and a predetermined time period. It is also possible to check whether or not there is update data in the server and then acquire any such update data, according to the user's instruction. The information as to whether or not there is update data in the server can be periodically transmitted to the image related data generator.

In one preferred embodiment of the present invention, the storage manager may add the update data into the control data storage, and also may overwrite the image processing control data corresponding to the specification data with the update data. In the former case, the old version of the image processing control data can be used as well as the new version. In the latter case, the old version of the image processing control data is deleted, thereby achieving effective use of the hardware resources of the control data storage module and easily managing the image processing control data where a large amount of the image processing control data is stored in the control data storage.

The overwritten area of the control data storage does not have to correspond to the area where the old version of the image processing control data is stored. By way of example, it is also possible to store the update data into a new area of the control data storage and make the old version invalid.

In one preferred embodiment of the present invention, the specification data can be at least a part of the image processing control data. In this embodiment, the data structure of the control data is storage, because there is no need to store additional data as the specification data.

In one preferred embodiment, the image related data generator may include an identification data storage module configured to store identification data mapped to the image processing control data, the identification data identifying each piece of the image processing control data. And in this embodiment, the specification data can be the identification data. This embodiment makes the data size of the specification data rather small, thereby reducing the amount of hardware resources required to store the specification data.

By way of example, the identification data may include the name or the version number of the image processing. The data size of this type of identification data is generally smaller than that of the image processing control data. Accordingly, using this small size specification data can reduce the time required for transmitting the update data from the server. And that also can reduce the use of the hardware resources of the server where the update data is stored and the time required for retrieving the update data, thereby enhancing the speed of the update data transmission process of the server.

The identification data can include attribute data of the image related data generator, such as the name of the device and the properties of the generation of the image data, and data related to the image output devices, such as the name of the device and the properties of the processing by the image output devices. In this embodiment, the image related data can acquire the update data corresponding to the image related data generator and the image output device specified by the identification data.

Another embodiment of the present invention is an image related data editor, which is connected to a server. The image related data editor comprises an input module, an update data acquiring module, and a relating module. The input module is configured to input image data and attribute data related to the image data, with the attribute data including at least one of image processing control data to control image processing of the image data and identification data to identify the image processing control data. The update data acquiring module is configured to acquire update data of the image processing control data based on the attribute data from the server. The relating module is configured to relate the image data to the update data.

The image processing may conducted in either of two ways. The first way is to input image related data including the image processing control data therein, and to modify the image processing control data. The second way is to input image related data including the identification data therein, and to change the identification data to the image processing control data corresponding to the identification data.

The image related data editor of the present invention can easily edit the attribute data included in the image related data so that the update data acquired from the server is included therein.

The server can be placed outside of the image related data editor as well as included in the image related data editor. Further, the server can be constructed with storage resources both outside and inside of the image related data editor, and can switchover between such storage resources according to a predetermined condition.

The image related data editor can be used in a combination with the image related data generator and other image output devices. Even when the image related data generator and the image output devices cannot use the update data, the combination of the image related data editor and the image related data generator and the other image output devices can be used to construct an image related data generating system or an image processing system, which uses the update data.

In the case where the image related data editor can perform the function of transmitting image data via a network, it can be used as an image related data server that transmits image related data via the network. In this embodiment, the image related editor can input image related data including the attribute data, generate modified image related data that reflects the update data, and transmit the modified image related data to other devices connected to the network. The destination may be the same device from which the original image related data is input, or may be a different device. The user who intends to transmit the image related data can easily apply the update data to the image related data in this manner.

Another embodiment of the present invention is an update data transmit apparatus, which is connected to a predetermined outer device. The update data transmit apparatus comprises an update data storage module, an input module, and an update data transmission module. The update data storage module pre-stores update data for image processing control data to control image processing of image data, the update data being mapped to at least one of the image processing control data and the identification data to identify the image processing control data. The input module is configured to input predetermined data from the outer device, the predetermined data including the image processing control data to be updated or the identification data. The update data transmission module is configured to transmit the update data corresponding to the predetermined data to the outer device. The update data transmit apparatus is typically constructed with a server that performs the functions of storing and transmitting the update data.

In this embodiment, various devices including the image related data generator and the image related data editor can, even when they do not store the update data therein, acquire and use the update data through communication with the update data transmit apparatus.

The update data transmit apparatus can integrally manage the mapping between the image processing control data and the identification data to the update data. This mapping is available for responding to the transmission requirement or the update data sent from various devices including the image related data generator and the image related data editor.

The image processing control data of the present invention can be set according to the image output devices that use the data during image processing. By way of example, the image processing control data can be set according to the type of the image output device. By way of example, the type of the image output device may be categorized into one of the following groups: personal computers that execute image processing application programs, printers, and projectors. The type also may be categorized according to the maker of the printer.

The update data transmit apparatus transmits the update data corresponding to the type of the image output device, thereby implementing appropriate image processing according to such type. By way of example, a user of a new type of printer can easily acquire the image processing control data corresponding to such new type. The maker of the printer also can easily provide the image processing control data for such new type.

In addition to the image related data generator, the image related data editor, and the update data transmit apparatus, the present invention also provides a method for generating or editing the image related data, and a method for transmitting the update data. A computer program that causes a computer executing each function of the above-mentioned devices or apparatuses, and a computer readable recording medium in which the computer program is stored are also provided.

Typical examples of the recording medium include flexible disks, CD-ROMs, magneto-optic discs, IC cards, ROM cartridges, punched cards, prints with barcodes or other codes printed thereon, internal storage devices (memories such as a RAM and a ROM) and external storage devices of the computer, and a variety of other computer readable media.

The above and other objects, features, aspects, and advantages of the present invention will become more apparent from the following detailed description of the preferred embodiments when read in conjunction with the accompanying drawings.

BRIEF DESCRIPTION OF THE DRAWINGS

FIG. 7 shows an example of the parameters of the image processing control data.

DESCRIPTION OF THE PREFERRED EMBODIMENTS

Exemplary embodiments of the present invention are discussed below in the following sequence:
A. Image output system;
A1. Construction of the System;
A2. Function Blocks of System;
A3. Data Structure of Image Files;
A4. Processing Mode and Image Processing Control Data;
A5. Image Processing Apparatus;
A6. Update of Image Processing Control Data;
A7. Advantages of the System;
B. Second Embodiment; and
C. Third Embodiment.

A. Image Output System

A1. Construction of the System

Figure 1:
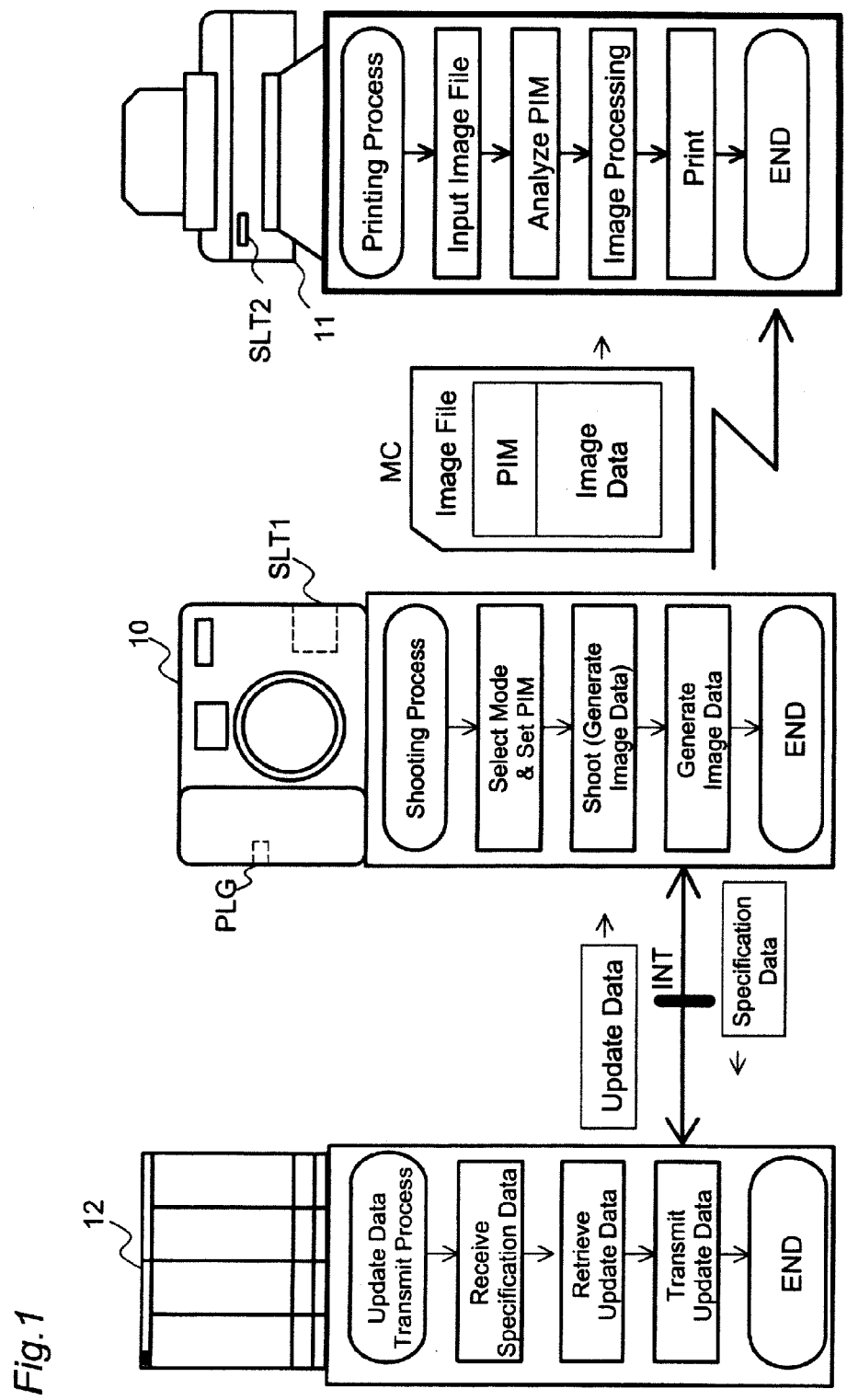
FIG. 1 is a schematic that shows the general construction of the image output system.

FIG. 1 is a schematic that shows the general construction of the image output system. The image output system of the first embodiment includes a digital still camera (DSC) 10 as an image related data generator, a color printer 11 as an image processing apparatus and an image output apparatus, and an update data storage server (UDS server) 12 as an update data transmit apparatus. Data transmission is achieved through a memory card MC between the DSC 10 and printer 11, and via a network INT between the DSC 10 and the UDS server 12. For this purpose, the DSC 10 is equipped with a network connection terminal PLG and a memory card slot SLT1, and the printer 11 is equipped with a memory card slot SLT2.

The DSC 10 generates an image file and transmits the image file to the printer 11 through the memory card MC. Two kinds of data are related and stored in the image file: image data and image processing control data (hereinafter referred to as "PIM parameters" or "PIM"). This data is used to control image processing of the image data that the printer 11 executes. The PIMs are pre-stored in the DSC 10, and attached in the image file according to the user's instructions.

In this embodiment, the image files adopt a specific file structure in conformity with the Exif (Exchangeable Image File) format standard for digital still cameras. The Exif format defines an image data recording area to record image data therein, and an attribute information recording area to record various attribute information related to the image data.

Though the DSC 10 as the image related data generator is discussed in this embodiment, various devices, such as scanners and digital video cameras, may be used as the image related data generator. In the case where the image related data generator can record movies, e.g., digital video cameras, the MPEG format may be used for the image data included in the image file. The image file including a movie, as image data, and the PIM can be used to control the image processing for the movie when it is output.

The printer 11 receives the image file from the DSC 10, analyzes it, and extracts the image data and the PIM from the image file. The printer 11, then, executes the image processing of the image data according to the PIM and prints out the image.

For data transmission between the printer 11 and the DSC 10, various techniques are applicable besides recording medium such as memory cards, and such techniques include networks, e.g., a LAN, and communications through infrared and cables. Various devices, such as CRTs and projectors, are applicable for the image processing apparatus and the image output apparatus.

The UDS server 12 sends update data to the DSC 10. The update data to be sent is determined based on the specification data sent from the DSC 10. The specification data includes predetermined information that specifies the update data to be sent. As discussed later, the specification data may include a part of the PIM, or identification data to identify the PIM. The UDS server 12 retrieves the update data according to the received specification data and determines the update data to be sent. The determined update data is transmitted to the DSC 10.

The client to which the UDS server 12 transmits the update data can be selected from among various devices that can use the update data for the PIM.

Various types of networks are applicable for the network INT including wide area networks, e.g., the Internet, and relatively limited networks, e.g., a LAN.

Figure 2:
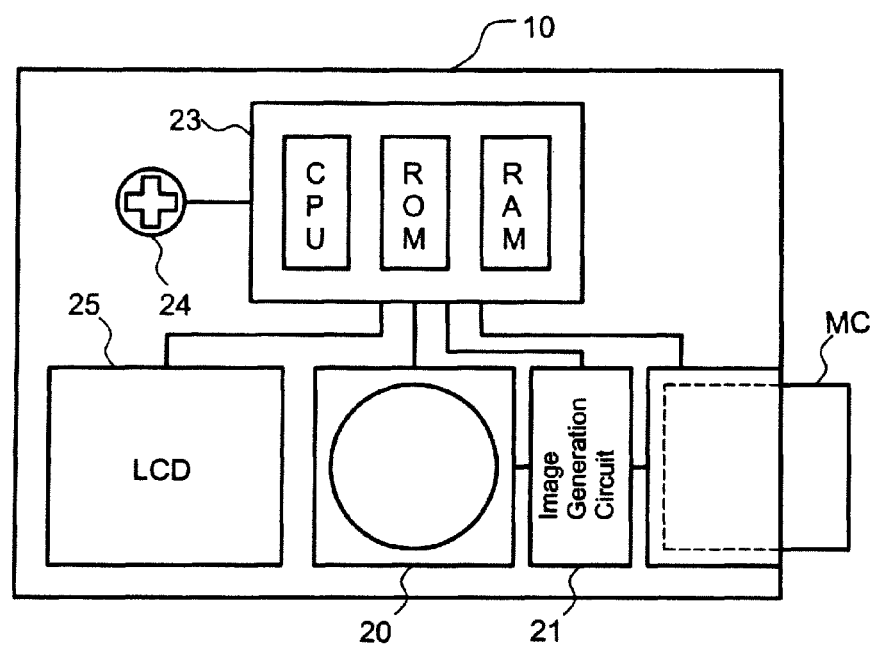
FIG. 2 is a schematic that shows the general construction of the digital still camera.

FIG. 2 is a schematic that shows the general construction of the digital still camera (DSC). The DSC 10 generates image data by means of collecting and focusing light rays onto a digital device, such as CCDs or photoelectric scanners. In the DSC 10, image data is generated by means of an optical circuit 121 including a CCD for collecting information regarding the light rays and an image acquisition circuit 122 for converting voltage signals of the CCD into image data.

The DSC 10 includes an optical circuit 20 to collect information regarding the light rays, an image generation circuit 21 to control the optical circuit 20 and to acquire images, and a control circuit 23. The control circuit 23 includes a CPU, ROM, and RAM.

The DSC 10 is also equipped with a select button 24 to input various settings and a LCD 25 to display pictures taken by the DSC 10, and various settings and information.

The DSC 10 generates image files including the image data and the PIM related to the image data. The user can set the PIM through operations of the select button 24. The image data is generated by the optical circuit 20 as described previously.

The PIM includes various information such as the following: gamma values of the DSC 10, setting parameters for contrast and color balance, and color space parameters that identifies the color space where the image data is defined. Besides these parameters, the PIM also includes various parameters related to the shooting condition: exposures, white balances, apertures, shutter speeds, and zoom settings.

The meaning of the phrase "color space parameters" is described below. In the DSC 10, the image data is ordinarily generated in the RGB color space from the voltage signal of the CCD. The type of camera determines one of the following two kinds of color spaces: sRGB color space and NTSC color space. Both color spaces are defined in the RGB coordinate system, and the range of color reproduction of NTSC is broader than that of sRGB. The sRGB color space is generally in the range of 8 bits (0 to 255); a color space that extends through this range to negative values or values of and over 256 (hereinafter referred to as the "extended sRGB space") may be used instead of the general sRGB color space. Information on the color space used for shooting is included as the color space parameter described previously and attached to the image data as information representing the color reproduction characteristics of the DSC 10.

A2. Function Blocks of System

Figure 3:
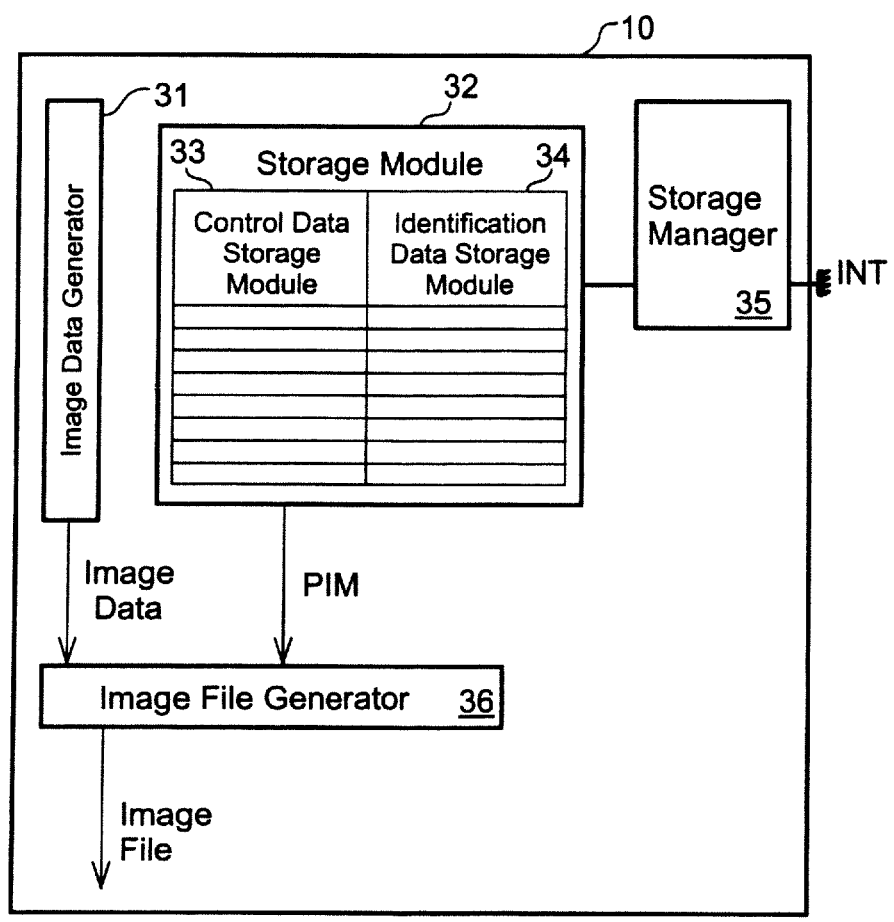
FIG. 3 is a schematic that shows the function blocks of the digital still camera.

FIG. 3 is a schematic that shows the function blocks of the DSC. These function blocks are implemented by software in the control circuit 23 where a CPU, ROM and RAM are installed therein (see FIG. 2).

An image data generator 31 controls the optical circuit 20, and generates image data from the information regarding the light rays collected by the image generation circuit 21 (see FIG. 2). A control data storage module 33 stores the PIMs. At least a part of the PIMs is stored in the RAM in a rewritable manner. An image file generator 36 generates an image file that records image data generated by the image data generator 31 and the PIM stored in the control data storage module 33 and related to the image data. The image file is an output file of the DSC 10 and is used in the outer devices, such as the printer 11.

A storage manager 35 manages the PIMs stored in the control data storage module 33 by storing update data, if the update data corresponding to the PIMs stored in the control data storage module 33 can be acquired. The storage manager 35 communicates with the UDS server 12 via the network INT to acquire the update data. The UDS server 12 is connected to the DSC 10 through the network INT, and functions to provide the update data. The storage manager 35 sends specification data to the UDS server 12. The UDS server 12 defines the update data to be transmitted based on the specification data, and transmits the update data.

The storage manager 35 receives the update data, which is the PIM in this embodiment, from the UDS server 12 and stores the PIM into the control data storage module 33. There are two options for storing the PIM into the control data storage module 33: 1) the acquired PIM may be added to the old data; and 2) the acquired PIM may overwrite the old data. In this embodiment, as discussed later, the user can select either one of these options.

An identification data storage module 34 stores identification data that identifies the PIM. The identification data is related to the PIM stored in the control data storage module 33. The identification data is used as the specification data that is sent to the UDS server 12 by the storage manager 35 to acquire the update data.

By way of example, the name, the property, or the version number of the image processing or the PIM is applicable as the identification data.

Figure 4:
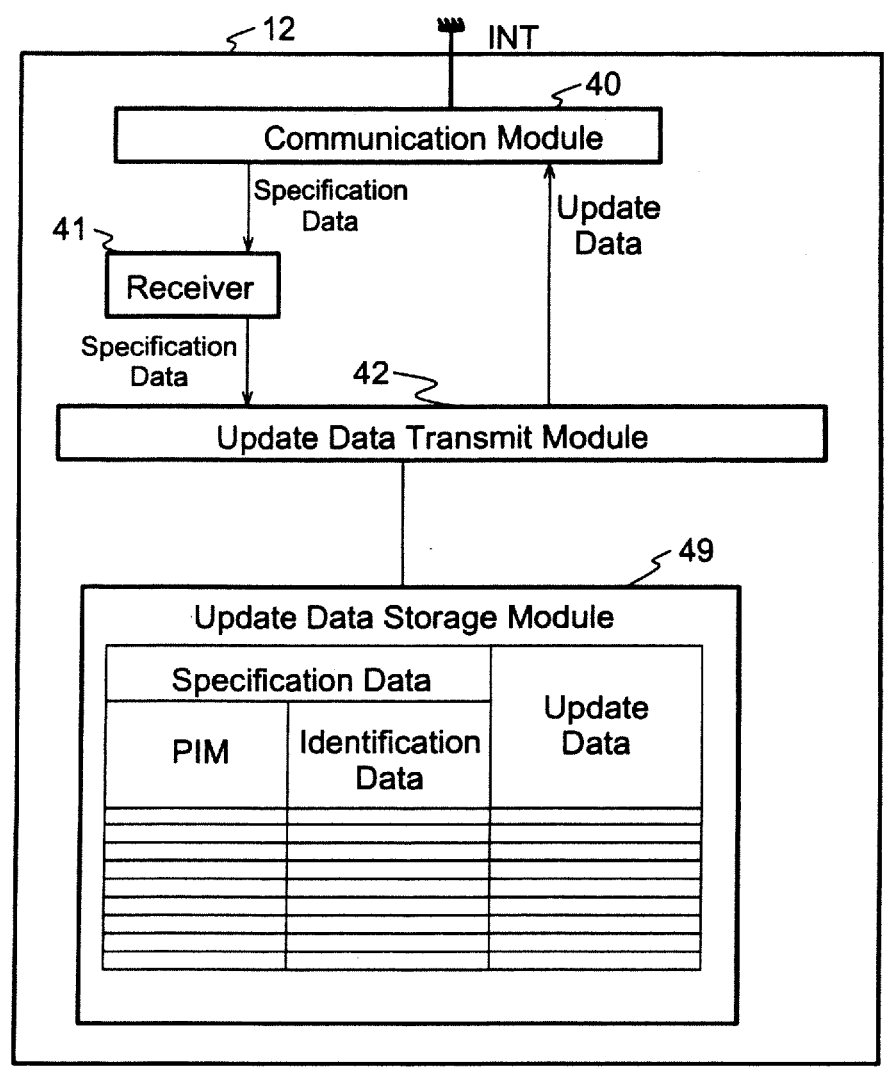
FIG. 4 is a schematic that shows the function blocks of the update data server.

FIG. 4 is a schematic that shows the function blocks of the update data server. The UDS server 12 receives the specification data from the DSC 10, and transmits the update data corresponding to the specification data.

The UDS server 12 includes the communication module 40 that controls the communication via the network INT. A receiver 41 receives the specification data via the network and inputs the specification data to an update data transmit module 42. The update data transmit module 42 determines the update data to be transmitted according to the specification data, and transmits the update data. The data stored in an update data storage module 49 is used to determine the update data to be transmitted.

The update data storage module 49 stores the update data mapped to the specification data. In this embodiment, the PIM and the identification data is used as the specification data.

Accordingly, the update data transmit module 42 specifies at least one of the PIM and the identification data included in the specification data, and compares each piece of PIM and identification data stored in the update data storage module 49, thereby determining the update data to be transmitted. The way to determine the update data to be transmitted is not restricted to the above-described methods.

A3. Data Structure of Image Files

Figures 5A, 5B:
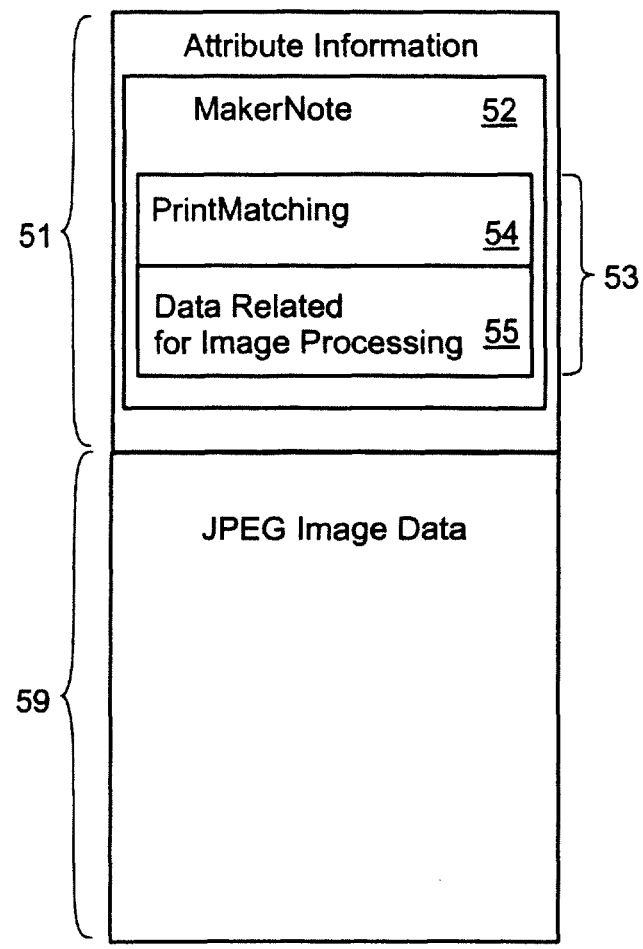
FIG. 5A and FIG. 5B are schematics that show the data structure of the image file.

FIG. 5A and FIG. 5B are schematics that show the data structure of the image file. As previously described, the image file can take the Exif format that is one of the standards of image files for DSCs.

The Exif format was established by JEIDA (Japan Electronic Industry Development Association). As shown in FIG. 5A, an image file in the Exif format has various recording areas: an image data recording area 59 to store image data; and an attribute information recording area 51 to store attribute information of the image data stored therein. The image data is stored in the JPEG format in the image data recording area 59.

Although the Exif standard applies the JPEG format to record the image data, the image files are not restricted to this format. In addition to the JPEG format, other formats that may be used to format the image data generated by the DSC include the PNG format, the TIFF format, the GIF format, and the BMP format. It will be apparent to those skilled in the art that any format that can include the image data and the attribute data may be used.

The attribute information recording area 51 stores the attribute information. The attribute information recording area 51 has a MakerNote recording area 52, which is a non-defined area and is released to the makers of the DSC. As is well known to the person having ordinary skill in the art, the Exif format uses tags to define each piece of data, and the tag that defines the data in the MakerNote recording area 52 is titled "MakerNote," which is called a MakerNote tag.

The MakerNote recording area 52 of the image file is divided into several areas, where the tag specifies the data stored therein. The recording area where the data related to the image processing is in the PrintMatching recording area 53. This area is specified with a "PrintMatching" tag, and is divided into two areas: 1) a recording area of the data structure 54; and 2) a recording area of the image processing 55. The recording area of the data structure 54 records the data structure related to the recording area of the image processing 55.

FIG. 5B schematically shows the data structure of the recording area of the image processing 55. Parameters to control the image processing are recorded as combinations of the name of the tag and the parameter value.

A4. Processing Mode and PIM

Figure 6A:
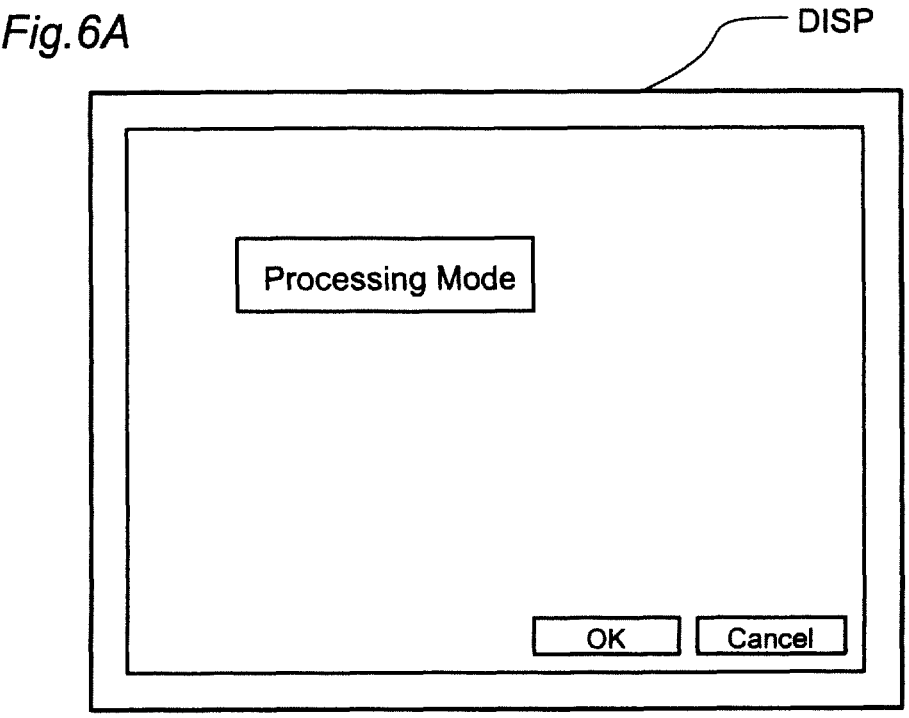
FIG. 6A and FIG. 6B are schematics that show an example of the interface window to set the image processing mode.
Figure 6B:
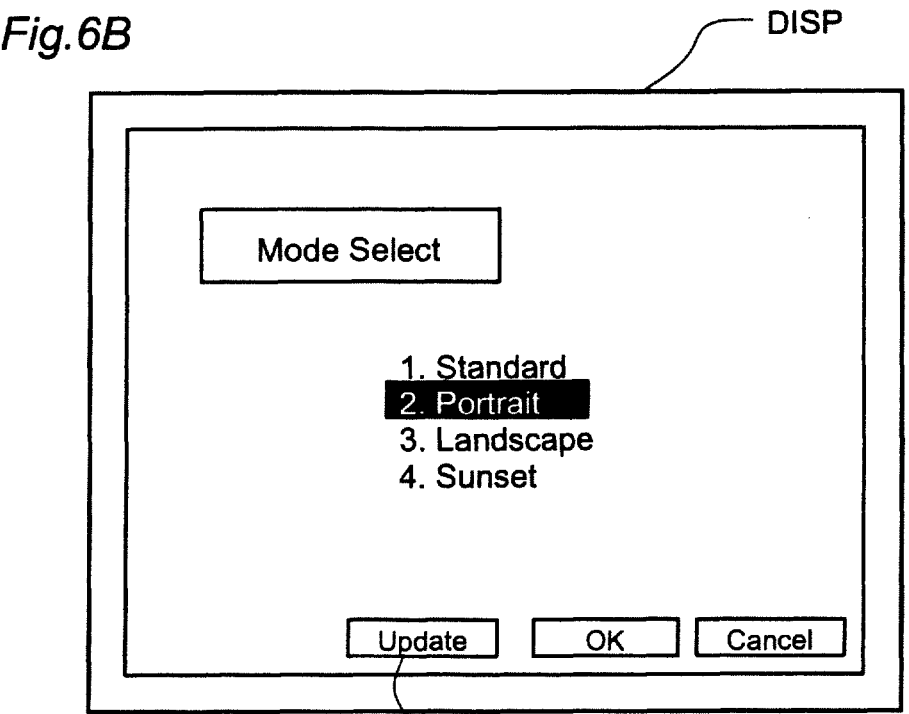

FIG. 6A and FIG. 6B are schematics that show an example of the interface window to set the image processing mode. This interface window is displayed on the LCD DISP of the DSC. The user can set the processing mode by selecting the "OK" button in the interface shown in FIG. 6A. In this embodiment, several processing modes are available: "1. Standard"; "2. Portrait"; "3. Landscape"; and "4. Sunset", as shown in FIG. 6B. The selection of the processing mode defines the PIM to be used when the image file is generated.

FIG. 7 shows an example of the parameters of the PIM. There are four processing modes that are suitable for four kinds of situations that may occur. The parameters of the PIM are pre-determined for each of these processing modes. In this embodiment, the PIM includes the four kinds of parameters shown in FIG. 7: "Gamma correction"; "color space"; "contrast"; and "color balance."

A5. Image Processing Apparatus

Figure 8:
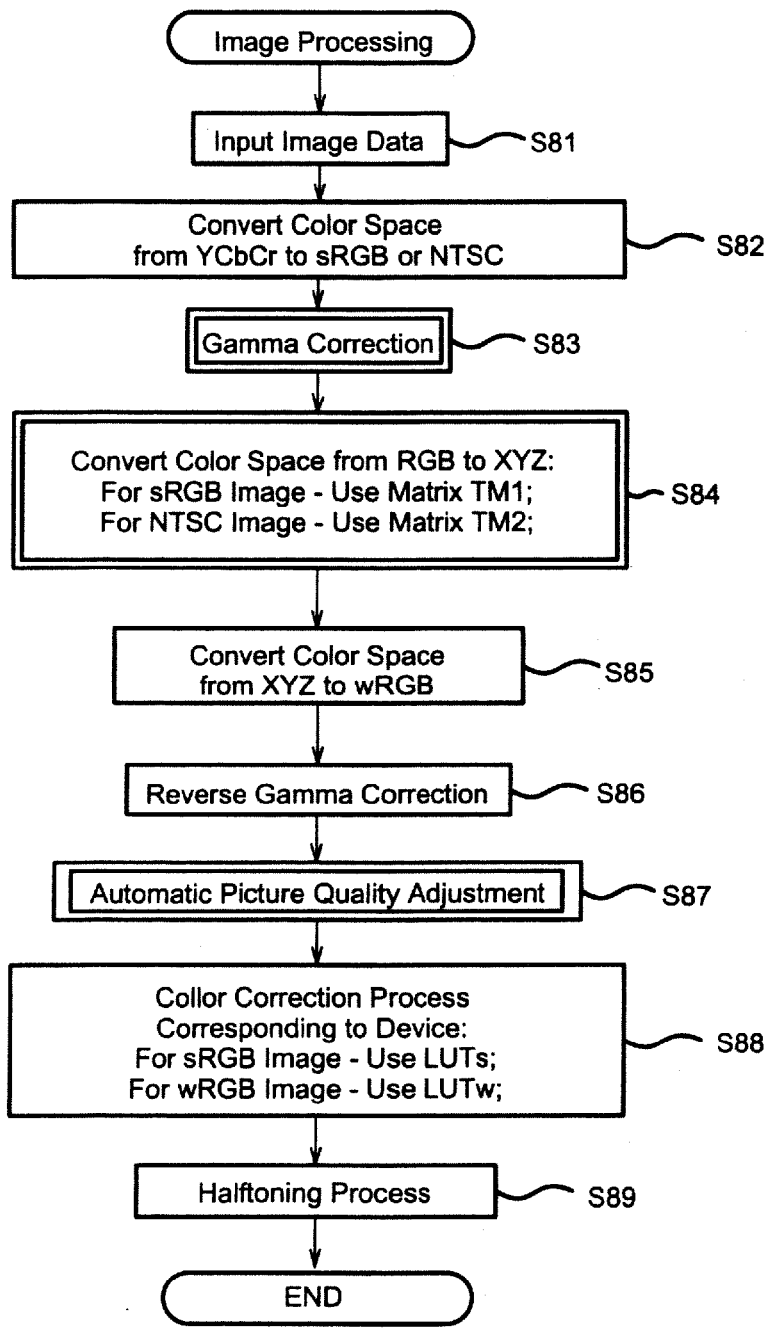
FIG. 8 is a flowchart of the image processing.

FIG. 8 is a flowchart of the image processing. The processes according to the PIM are depicted with double lines.

The CPU of the color printer 11 inputs an image file and extracts image data from the image file (Step S81). The printer 11 then converts the image data in the YCbCr color space into data in the RGB color space used for shooting (Step S82). An inversion matrix, which is inverse to a matrix used for conversion from the RGB space to the YCbCr space in the digital still camera 10, is applied for this conversion. This process converts the image data into the data in the color space used for shooting, that is, one of the NTSC color space, the sRGB color space, and the extended sRGB color space. In the case of conversion into the extended sRGB color space, the color reproduction range includes negative values and values of and over 256.

The printer 11 then performs gamma correction of the image data (Step S83). The gamma value used for the gamma correction is included in the control data as information representing the characteristics of the digital still camera 10.

After completion of the gamma correction, the printer 11 converts the color space of the image data into the wRGB color space, which is defined to have a wider color reproduction range than the sRGB color space (Step S84). When the image data defined in either the NTSC color space or the extended sRGB color space is processed in the sRGB color space having the narrower color reproduction range, the colors of the subject may not be reproduced accurately. From this point of view, the image data generated in the sRGB color space may skip a series of processing steps, as discussed below. In this embodiment, however, the color space information included in the control data does not discriminate the sRGB color space from the extended sRGB color space. Accordingly, the procedure of this embodiment carries out the conversion of the image data generated in the sRGB color space into data in the wRGB color space. Even under such conditions, since the image data in the extended sRGB color space includes negative values or values of or over 256, the extended sRGB color space may be distinguished from the sRGB color space based on these tone values.

Matrix computation is applied for the conversion into the wRGB color space. As described previously, the printer 11 deals with image data defined in either the sRGB color space or the extended sRGB color space and the image data defined in the NTSC color space. Matrices for directly converting the image data in the respective color spaces into data in the wRGB color space may be specified. The procedure of this embodiment, however, carries out conversion via a standard XYZ color space.

The printer 11 first carries out the conversion from the RGB color space to an XYZ color space (Step S84). The conversion process depends upon the color space in which the image data is defined. Accordingly, the procedure of this embodiment provides two conversion matrices in advance, that is, a conversion matrix TM1 for the sRGB color space or the extended sRGB color space and another conversion matrix TM2 for the NTSC color space, and selectively uses one of the two conversion matrices TM1 and TM2 to implement the conversion according to the color space used for shooting. The conversion changes the individual color spaces, in which the image data is generated, into the standard XYZ color space.

The printer 11 then carries out conversion from the XYZ color space to the wRGB color space (Step S85). Matrix computation is also applied for this conversion. An identical matrix is used for this conversion, irrespective of the color space used for shooting. The matrix used for the computation may be set arbitrarily according to the definition of the wRGB color space.

After completion of the color space conversion process, the printer 11 carries out inverse gamma correction (Step S86). The gamma value used here is set, based on the color reproduction characteristics of the image output device.

The printer 11 subsequently carries out automatic adjustment of the picture quality to reflect the intention of the photographer in shooting (Step S87). In this embodiment, the adjustment parameter with regard to, for example, the contrast is included as the color correction parameter in the control data. The printer 11 implements the automatic adjustment based on this parameter. The method of the adjustment is known in the art and is thus not specifically described here.

This series of processing completes the correction of the image data that reflects the color reproduction characteristics of the DSC 10 and the intention of the photographer in shooting. The printer 11 converts the processed image data into a specific format suitable for printing.

The printer 11 causes the RGB image data to be subjected to a color conversion process corresponding to the type of the printer (Step S88). This process converts the RGB color system into the CMYK color system used in the printer. The conversion is performed by referring to a conversion lookup table (LUT) that maps the colors of one color system to the colors of the other color system. The procedure of this embodiment typically uses a conversion table LUTw for conversion of the wRGB color space into the CMYK color space. The printer 11 also stores another conversion table LUTs for the sRGB color space, in order to allow processing of image data defined in the sRGB color space. The printer 11 selectively uses the appropriate conversion table corresponding to the color space in which the image data is defined. The conversion table LUTs may be used, for example, when the color space conversion process of steps S84 and S85 is skipped for the image data obtained in the sRGB color space and when the input image file is output without any processing for adjusting the picture quality.

The printer 11 then carries out halftoning of the image data converted to the tone values of CMYK (Step S89). The halftoning process enables the tone values of the image data to be expressed by the density of the dots formed by the printer. Any known method such as, for example, the error diffusion method or the systematic dither method, may be applied for the halftoning process.

In addition to the above-described series of processing steps, the printer 11 may carry out a resolution conversion process, which converts the resolution of picture data into a printing resolution adopted in the printer, and an interlace data generation process, which sets a data arrangement and feeding quantities of sub-scan to enable interlace recording in the printer.

The picture data is converted into a specific format of print data that enables immediate output from the printer 11 through the conversion at steps S88 and S89. The printer 11 implements printing based on the converted data.

A6. Update of PIM

Figure 9A:
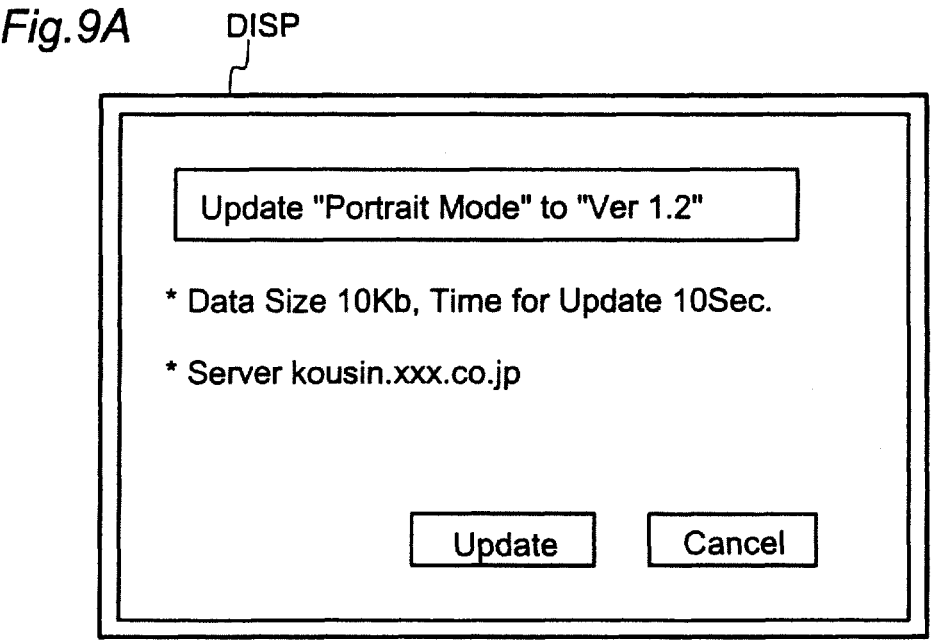
FIG. 9A and FIG. 9B are schematics that show an example of the interface window to update the image processing control data.
Figure 9B:
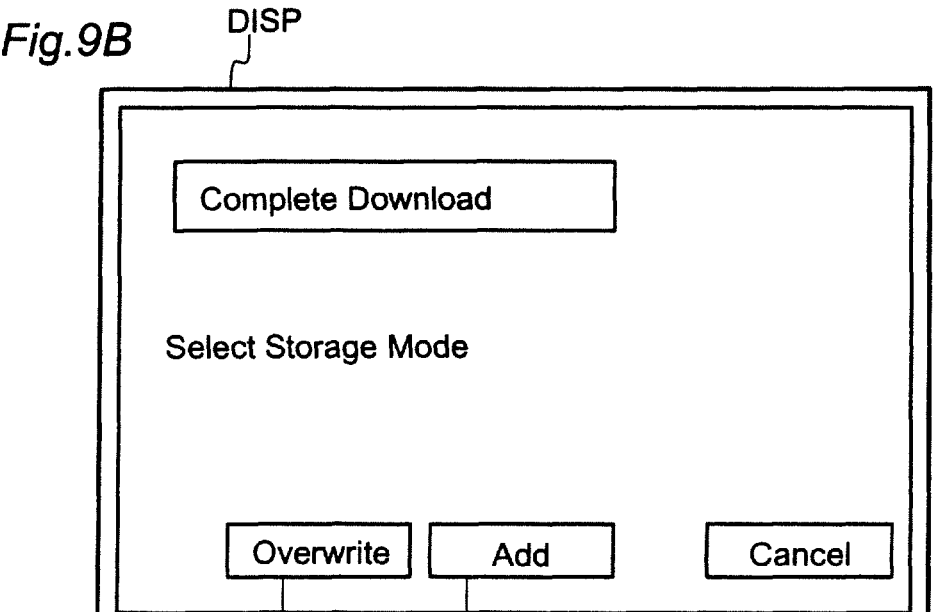

FIG. 9A and FIG. 9B are schematics that show an example of the interface window to update the PIM. This interface is subsequently displayed when the update button 61 in FIG. 6B is selected.

FIG. 9A is a schematic of an interface to give a final instruction for updating the PIM. In this figure, the interface shows that update of the PIM for "Portrait" mode to "Ver.1.2" is available. The interface also displays the size of the update data to be downloaded, the estimated time required for downloading, and information regarding the UDS server 12 from which the update data is downloaded.

FIG. 9B is a schematic of an interface that is subsequently displayed after the "Update" button in FIG. 9A is selected and the download is completed. This interface indicates completion of the download and requires selection of the storage mode regarding the way in which the downloaded update data is to be stored. The storage mode is selected by add button 72 and overwrite button 71. In the case where the add button 72 is selected, the update data is added to the PIMs that are already stored in the DSC 10. In the case where the overwrite button 71 is selected, the update data is overwritten to the old-version PIM corresponding to the update data.

Figure 10A:
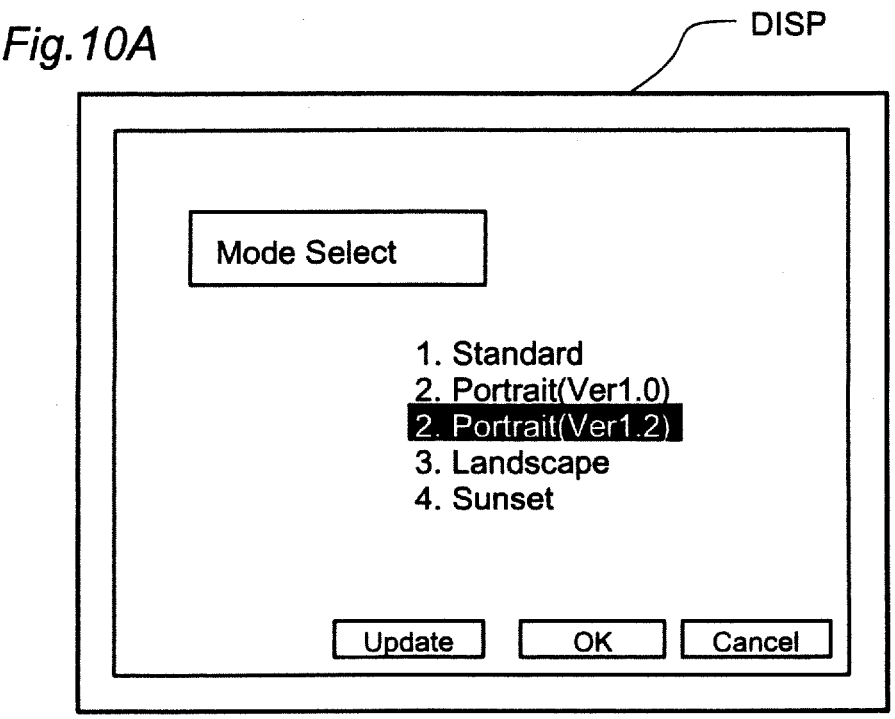
FIG. 10A and FIG. 10B are schematics that show an example of the interface window to apply the update data.
Figure 10B:
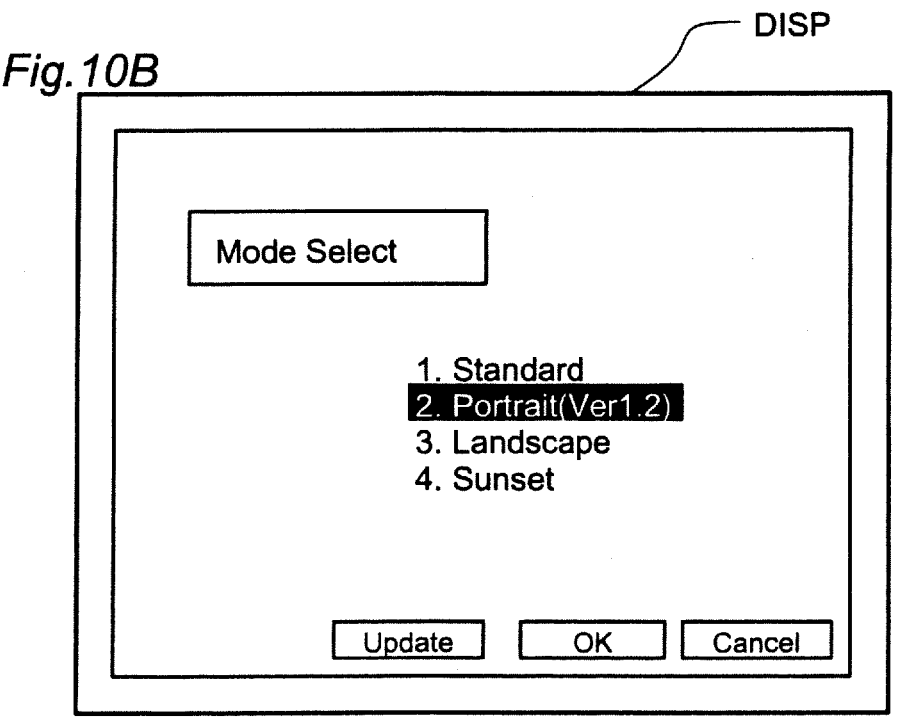

FIG. 10A and FIG. 10B are schematics that show an example of the interface window to apply the update data. These interfaces are modified versions of the interfaces shown in FIG. 6B. In these interfaces, the menu regarding the "Portrait" mode varies according to downloading and storing, relative to that shown in the FIGS. 9A and 9B, with the update data corresponding to the mode.

In the case where the add button 72 is selected in FIG. 9B, the old version of "Portrait" mode, depicted as "Portrait (Ver1.0)" in the FIG. 9B" is available. In the case where the overwrite button 71 is selected in FIG. 9B, on the other hand, the PIM for "Portrait (Ver1.0)" mode is deleted, and the old version cannot be selected, as shown in FIG. 10B.

Figure 11:
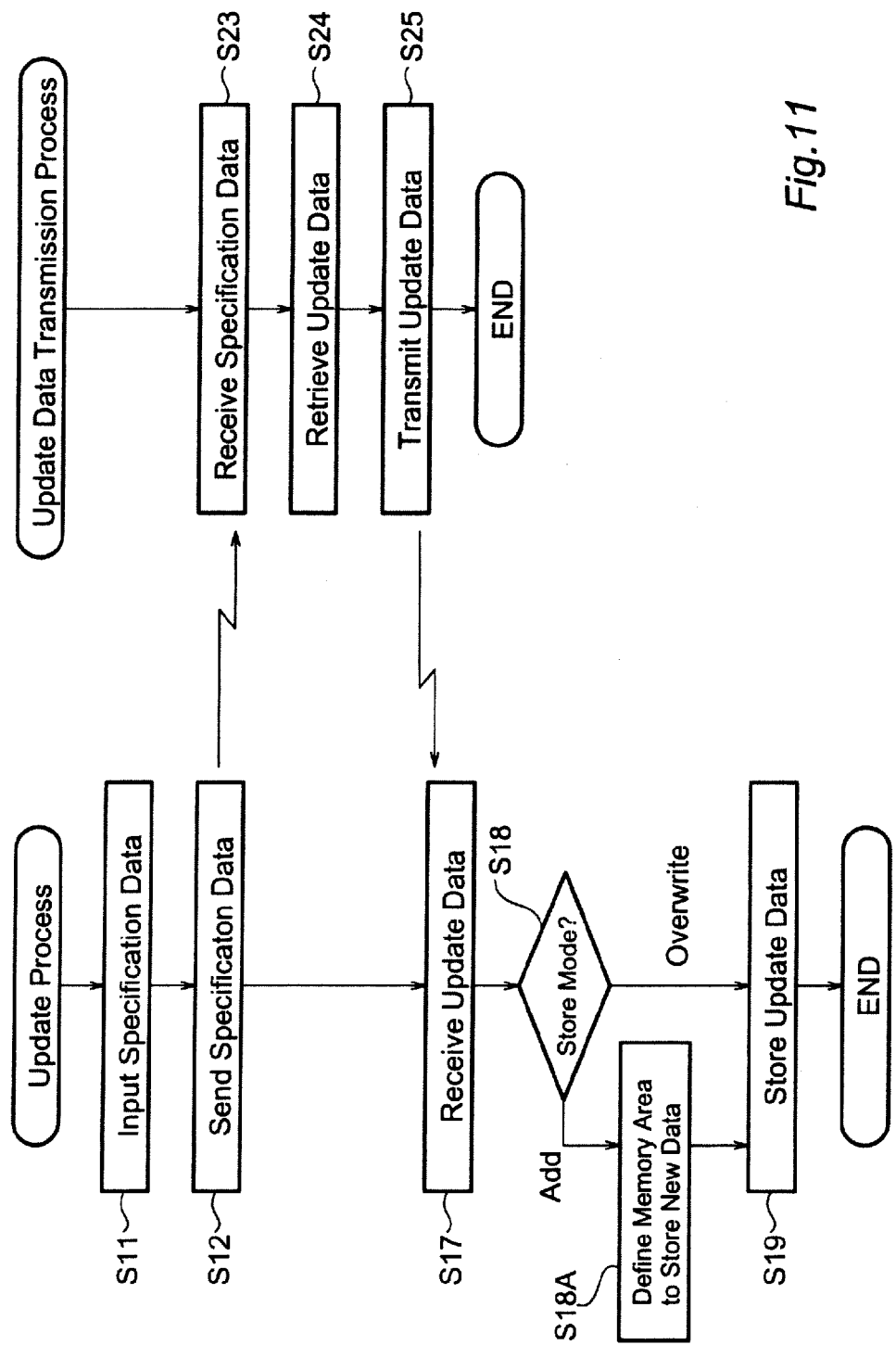
FIG. 11 is a flowchart of the update data transmission process.

FIG. 11 is a flowchart of the update data transmission process. Processing of the DSC 10 that requires the update data is shown in the left side, and processing of the UDS server 12 that transmits the update data is shown in the right side.

The DSC 10 inputs specification data (Step S11). As previously described, the specification data includes PIM or identification data. The specification data is sent to the UDS server 12 (Step S12).

The UDS server 12 receives the specification data (Step S23). The UDS server 12 compares the specification data to each piece of data stored in the update data storage module 49, thereby retrieving the update data to be transmitted (Step S24). Then the UDS server 12 transmits the update data to the DSC 10 (Step S25).

The DSC 10 receives the update data from the UDS server 12 (Step S17) and determines the storage mode (Step S18). In the case of the addition mode where the add button 72 in FIG. 9B is selected, the DSC 10 defines a memory area to store the update data (Step S18A) without losing the old-version PIM, and stores the update data to the defined memory area (Step S19). In the case of the overwrite mode where the overwrite button 71 in FIG. 9B is selected, on the other hand, the DSC 10 stores the update data in a manner that overwrites the old-version PIM (Step S19).

In this embodiment, the update data is stored in the same memory area where the old-version PIM is stored. But the memory area is not restricted to the same memory area. By way of example, one applicable way to overwrite is to store the update data to a different memory area from the area where the old-version PIM is stored and to invalidate the old-version PIM or the specification data corresponding to the old-version PIM.

Figure 12:
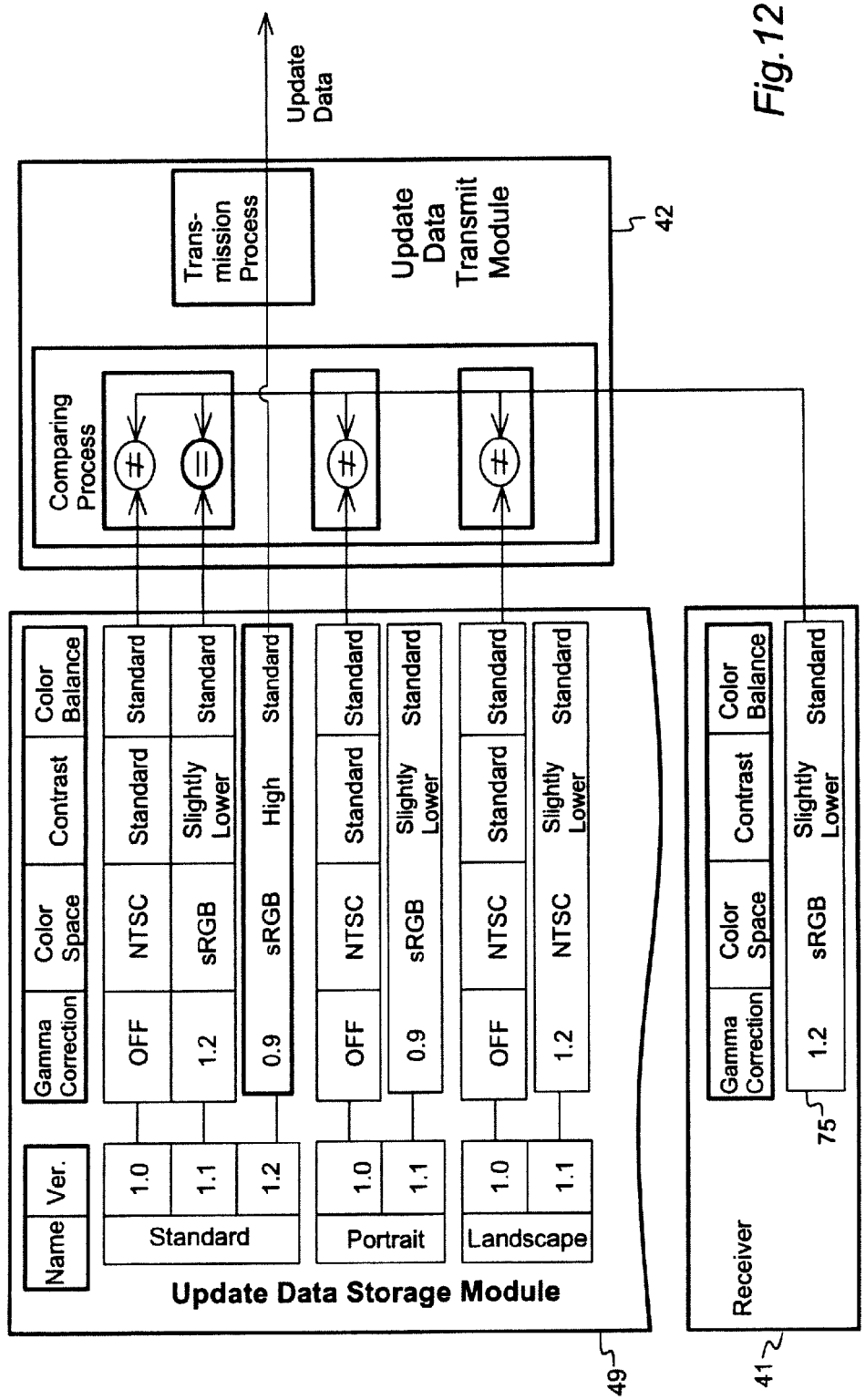
FIG. 12 is a schematic that shows a first example of the processing of the update data server.

FIG. 12 is a schematic that shows a first example of the processing of the update data server. The specification data or old-version PIM 75 is compared to data stored in the update data storage module 49. In this example, the data corresponding to the PIM of "Standard, Ver.1.1" is equivalent to the specification data 75. And the UDS server 12 finds that there is a new version of the data, depicted "Ver.1.2" in FIG. 12. Accordingly, the latest version of the PIM, "Standard Ver.1.2", is defined as the update data to be transmitted. The UDS server 12 extracts the update data from the update data storage module 49 and transmits it.

Figure 13:
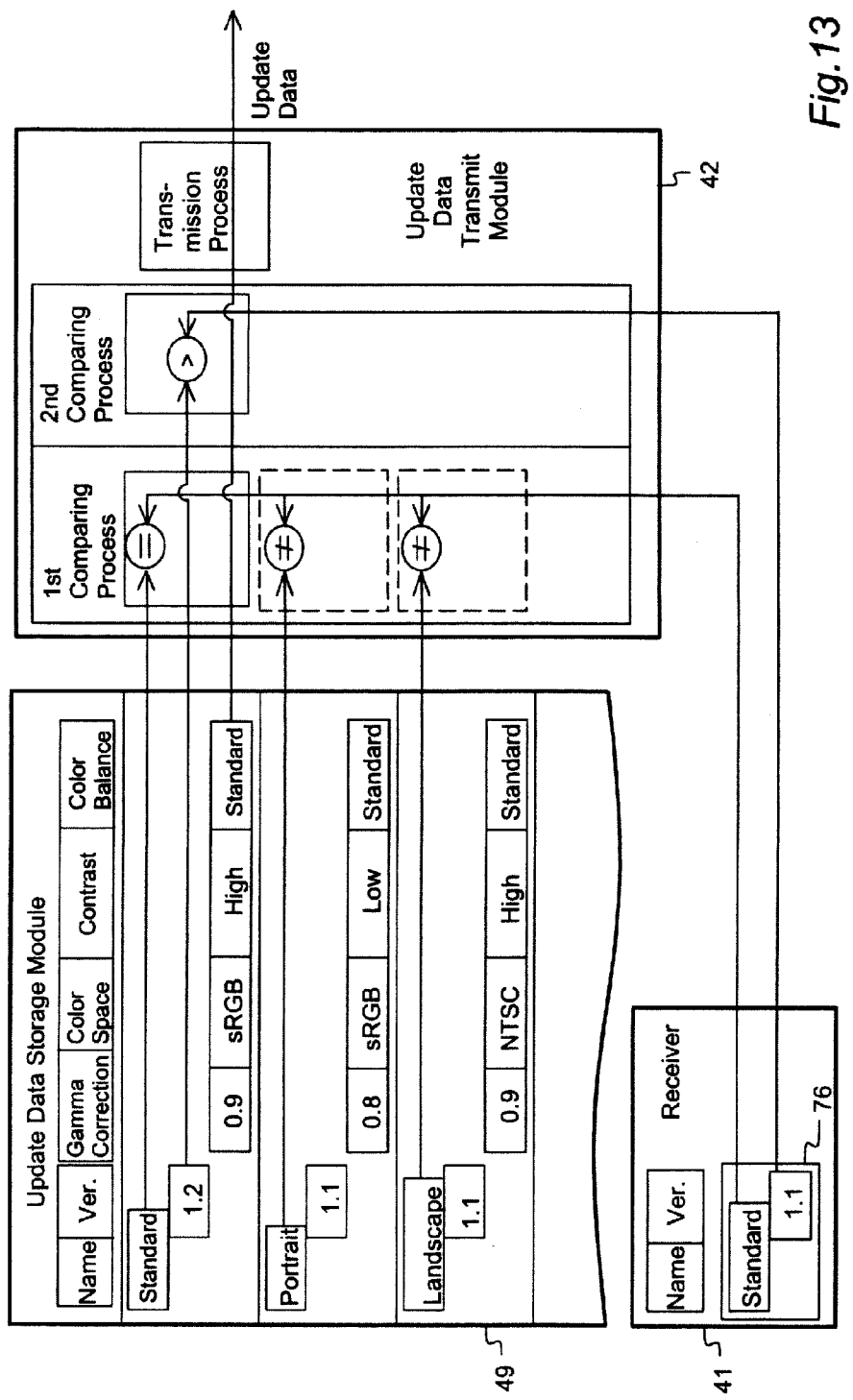
FIG. 13 is a schematic that shows a second example of the processing of the update data server.

FIG. 13 is a schematic that shows a second example of the processing of the update data server. In this example, the receiver 41 receives the identification data 76 from the DSC 10. This identification data 76 is compared to data stored in the update data storage module 49 by the update data transmit module 42. In this example, the name of the processing mode is compared first, then the version number; through these two steps of comparison the specification data is identified as being equivalent to the "Standard Ver.1.1". And the update data transmit module 42 finds that there is a new version of PIM, Ver.1.2, and that the Ver.1.1 that is identified by the identification data 76 is an old version. The update data transmit module, accordingly, extracts the latest version of the PIM of "Standard" mode, Ver.1.2, and transmits it.

A7. Advantages of the System

In this embodiment, the DSC 10 can acquire the update data corresponding to the PIM, and thereby easily use such update data. For example, in the case where makers of the DSC 10 provide new-version PIMs for users, the DSC 10 of the present embodiment easily acquires and stores the update data and thereafter uses it.

The user of the DSC 10 easily selects between two storage modes: 1) the addition mode; and 2) the overwrite mode. This makes the management of the PIMs easy, and reduces the hardware resources required to store the PIMs.

In this embodiment, the specification data to be sent to acquire the desired update data can be defined in various forms: 1) PIM stored in the DSC 10; and 2) identification data that identifies the PIM. This enables various types of image related data generators to update the PIM according to the update data. Even when the system can be sent only one of the PIM and the identification data as the specification data, the system can still update the PIM.

The UDS server 12 can accept various types of specification data, thereby responding to requests for the update data from various types of clients.

The UDS server 12 of the present invention easily updates the PIM stored in image related data generators such as the DSC 10, which is connected to the UDS server 12, and thereby reduces the amount of labor required to provide the update data of the operator of the UDS server 12, and integrally manages the update data and the mapping between the update data and the PIMs.

B. Second Embodiment

Figure 14:
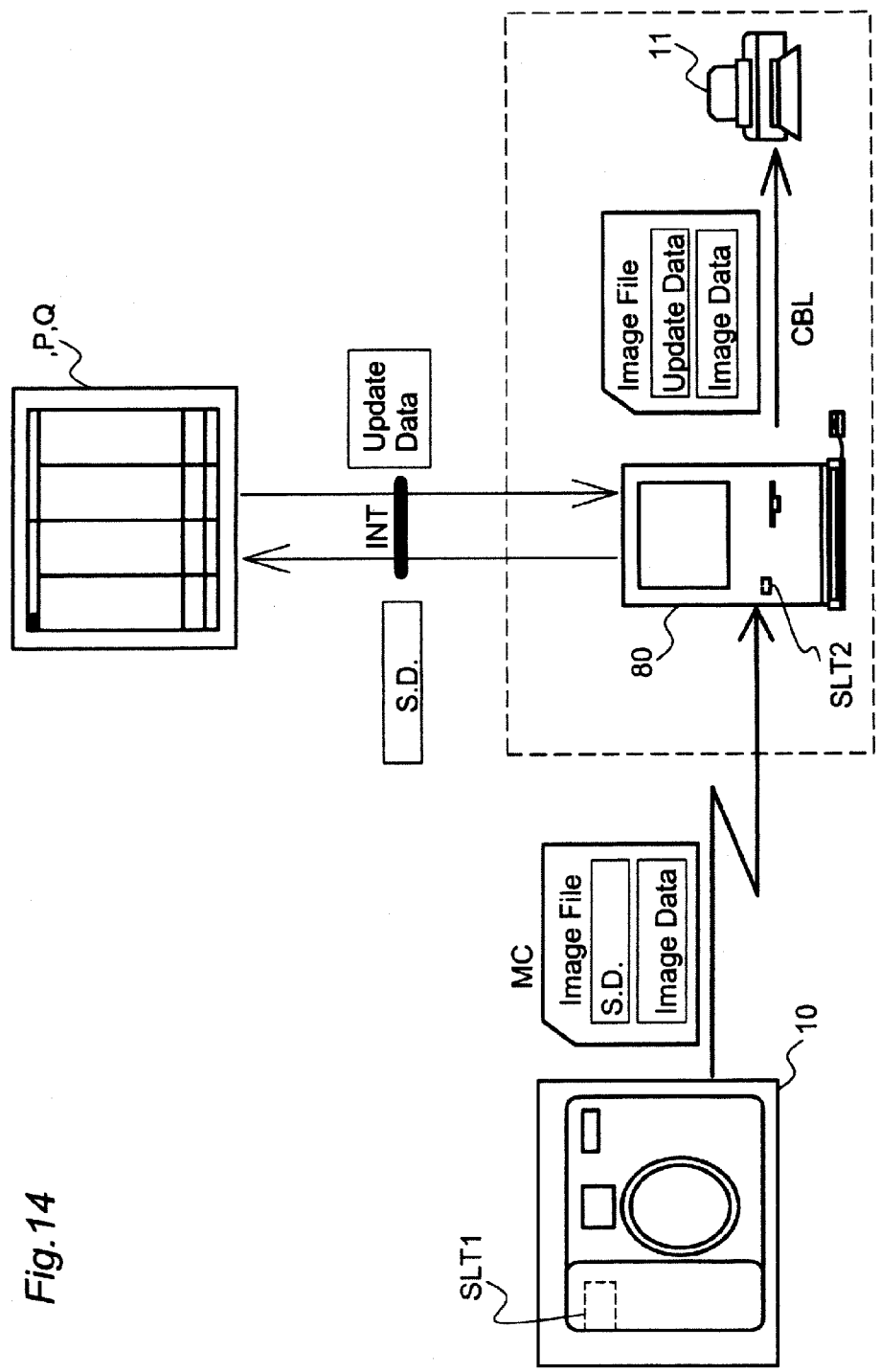
FIG. 14 is a schematic that shows the general construction of the image output system.

FIG. 14 is a schematic that shows the general construction of the image output system. In this embodiment, the personal computer 80 communicates with the UDS server 12 via the network INT as an image related data editor. The computer 80 also communicates with the DSC 10 as an image related data generator via the memory card MC. The computer 80 is connected to the printer 11 as an image processing apparatus and an image output apparatus.

The DSC 10 sends image files to the computer 80 via the memory card MC. For this purpose, the DSC 10 and the computer 80 are equipped with memory card slots SLT1, SLT2, respectively. In this embodiment, an image file including image data and specification data therein, is sent to the computer 80. The specification data is similar to that in the first embodiment, and includes at least one of the PIM and the identification data to identify the PIM. In other words, the specification data includes predetermined data to specify the update data corresponding to the image data.

The computer 80 functions as the image related data editor, and edits the original image file that is generated by the DSC 10. During the editing process, the computer 80 acquires the update data, by sending the specification data recorded in the image file to the UDS server 12. The computer 80 outputs the modified image file in which the update data and the image data extracted from the original image file are related and recorded. In this embodiment, the update data is the PIM, which is sent to the printer 11 and is used for image processing for the print out. The functions of the UDS server 12 and the printer 11 are the same as those described in connection with the first embodiment.

Figure 15:
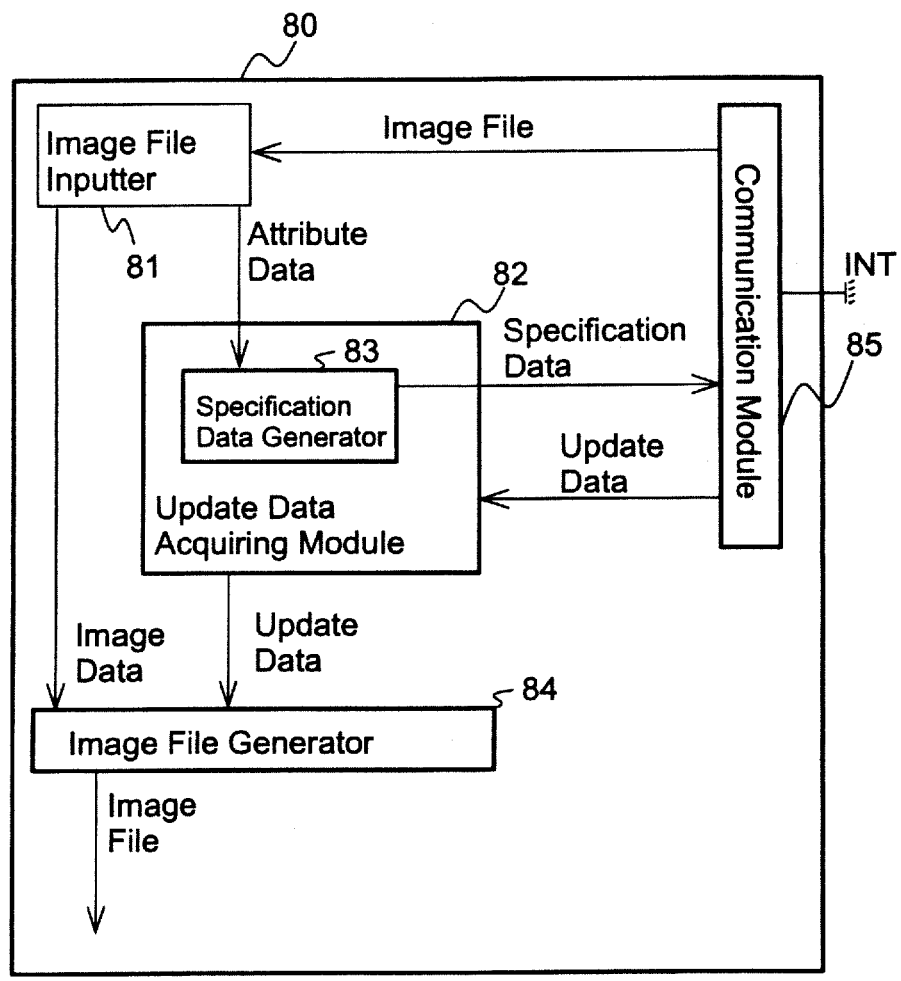
FIG. 15 is a schematic that shows the function blocks of the image related data editor.

FIG. 15 is a schematic that shows the function blocks of the image related data editor. The image file that the image file inputter 81 inputs includes image data and attribute data. The specification data is included in the attribute data, and is extracted by the specification data generator 83 in the update data acquiring module 82. The extracted specification data is sent to the UDS server 12, which is connected with the network INT, via the communication module 85. The update data is sent from the UDS server 12 to the update data acquiring module 82 via the communication module 85. The image file generator 84 generates the modified image file in which the update data and the image data extracted by the image file inputter 81 are related and stored.

Figure 16:
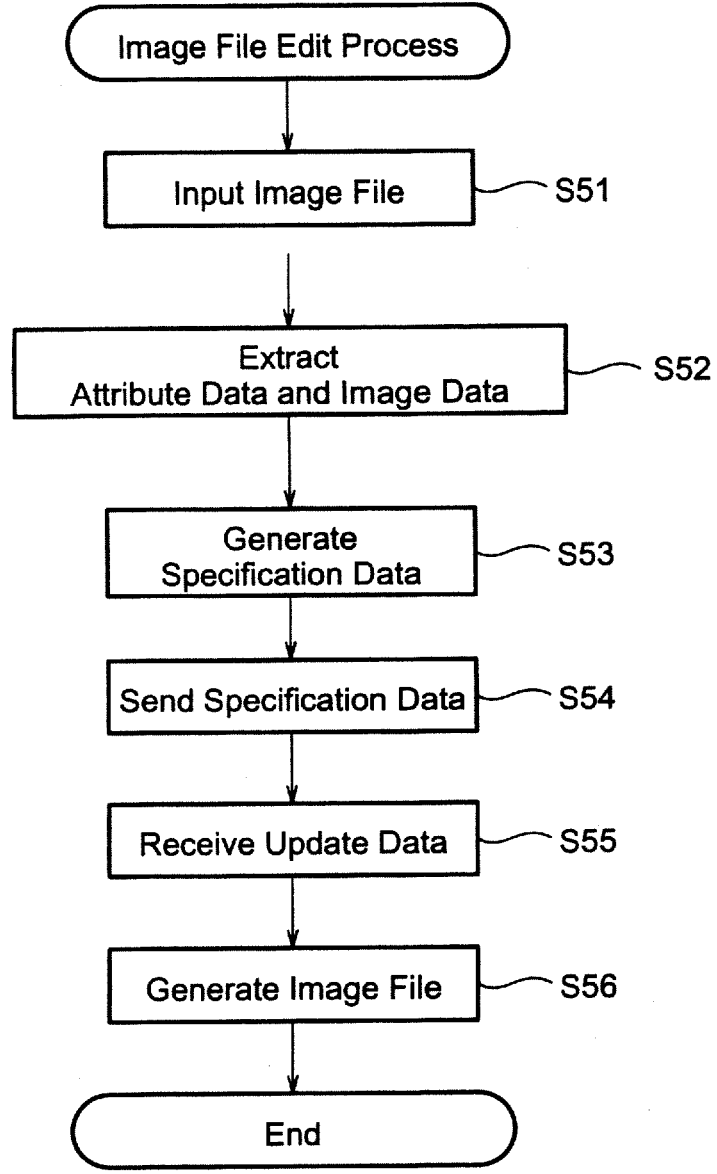
FIG. 16 is a flowchart of the image file edit process.

FIG. 16 is a flowchart of the image file edit process. The computer 80 inputs the image file (Step S51) and extracts the attribute data and the image data from the image file (Step S52). The computer 80 further extracts the specification data from the attribute data (Step S53) and sends the specification data to the UDS server 12 (Step S54). Then, the computer 80 receives the update data from the UDS server 12 (Step S55). Subsequently, the computer 80 generates the modified image file with the update data and the extracted image data (Step S56).

In this embodiment, the image related data editor that can acquire the update data from the UDS server 12 can easily edit the image file so that the update data is recorded in the attribute data of the image file. The specification data may include at least one of the PIM and the identification data, and this makes the image related data editor useful because the editor can handle various types of image files as long as it includes at least one of the PIM and the identification data. The image related data editor of this embodiment is especially useful in the case where many image files with various types of PIM need to be edited to include the update data.

C. Third Embodiment

The third embodiment of the present invention, which utilizes an image file transmission server, is discussed below. The image file transmission server in this embodiment edits the original image file sent from a client, and transmits the modified image file to the instructed destination.

Figure 17:
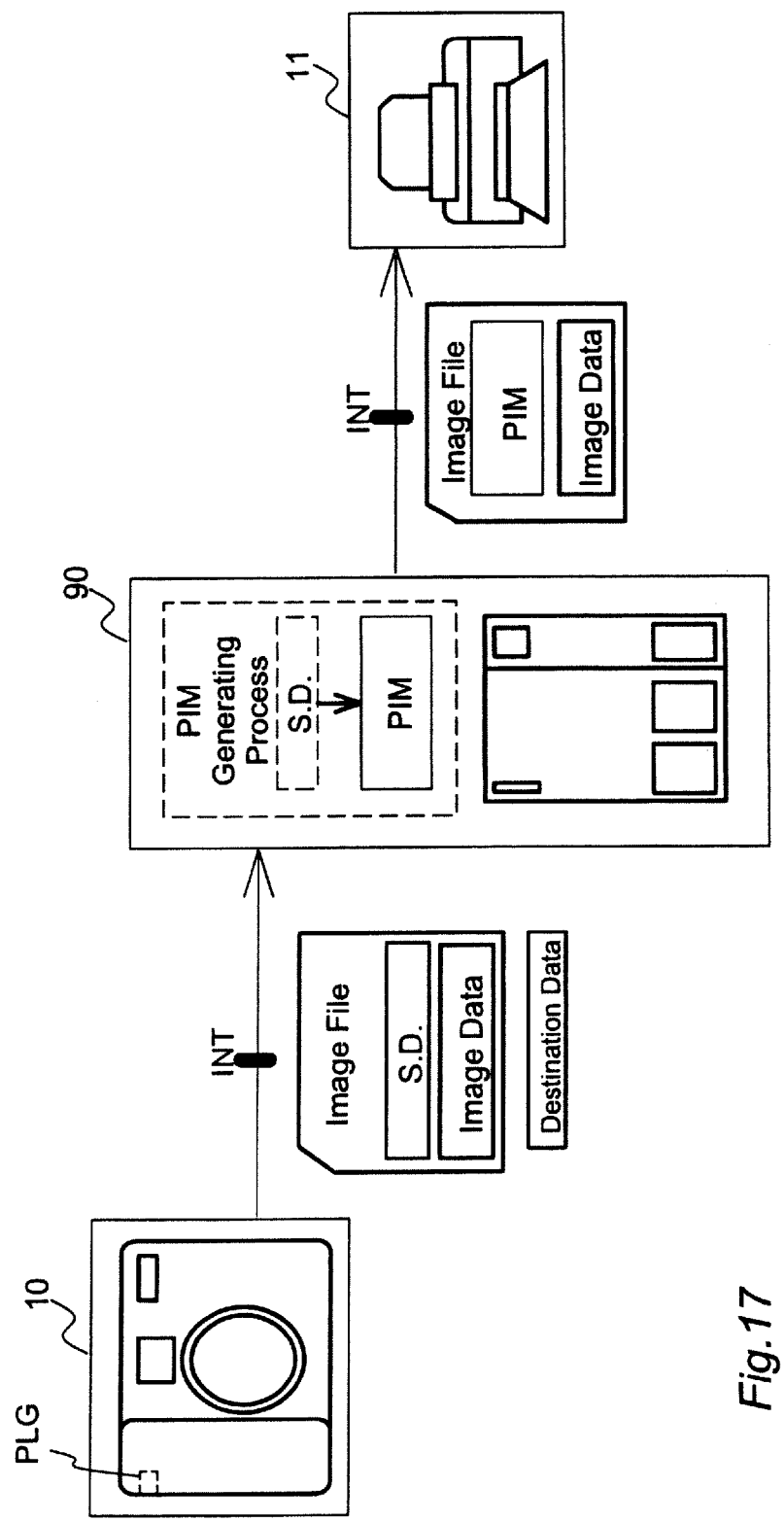
FIG. 17 is a schematic that shows the general construction of the image output system.

FIG. 17 is a schematic that shows the general construction of the image output system. Data transmission via the network INT takes place between the DSC 10 and the image file transmission (IFT) server 90, and also between the IFT server 90 and the printer 11. The DSC 10 is equipped with a network connection terminal PLG to perform this transmission.

The data sent from the DSC 10 to the IFT server 90 includes two kinds of information: 1) the image file, including the specification data and the image data therein; and 2) the destination data that specifies the destination where the modified image file is to be transmitted.

The IFT server 90 edits the image file as an image related data editor. The IFT server 90 generates the PIM as the update data, based on the specification data. This function is similar to that of the UDS server 12 in the previous embodiments, and, as such, the details of such function have already been described herein. The IFT server 90 transmits the modified image file to the instructed destination according to the destination data. In this example, the destination is the printer 11 that is possessed by the user of the DSC 10.

Figure 18:
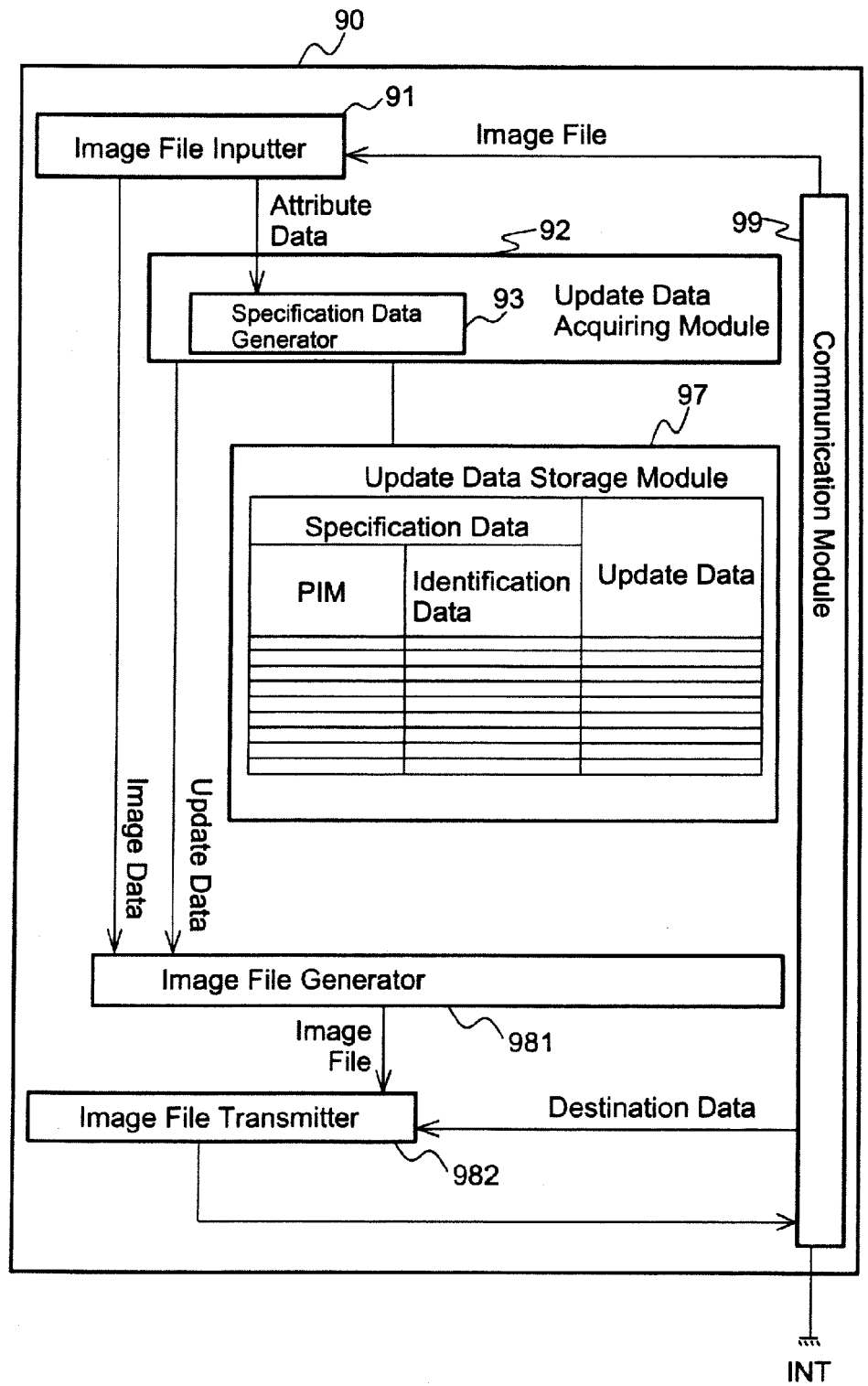
FIG. 18 is a schematic that shows the function blocks of the image file transmission server.

FIG. 18 is a schematic that shows the function blocks of the IFT server 90. The IFT server 90 also functions as an image related data editor. Some parts of the function blocks illustrated in FIG. 18 are similar to those of the image related data editor shown in FIG. 14. One of the differences is that the IFT server 90 does not acquire the update data from the outer devices; the update data acquiring module 92, accordingly, does not have the function of acquiring the update data through the communication module 99.

The update data acquiring module 92 refers to the update data storage module 97, thereby generating the update data corresponding to the specification data, which is extracted by the specification data generator 93 from the image file.

The function of the update data acquiring module 92 generating the update data is similar to that of the update data transmit module 42 of the UDS server 12 (see FIG. 4). The update data acquiring module 92 compares the specification data to data stored in the update data storage module 97, and determines the update data to be used for the update. The update data storage module 97 is similar to the update data storage module 49 in the UDS server 12.

Image file generator 981 generates an image file in which the update data generated by the update data acquiring module 92 and the image data extracted from the image data are related and stored. The image file is transmitted by image file transmitter 982 to the destination according to the destination data.

Figure 19:
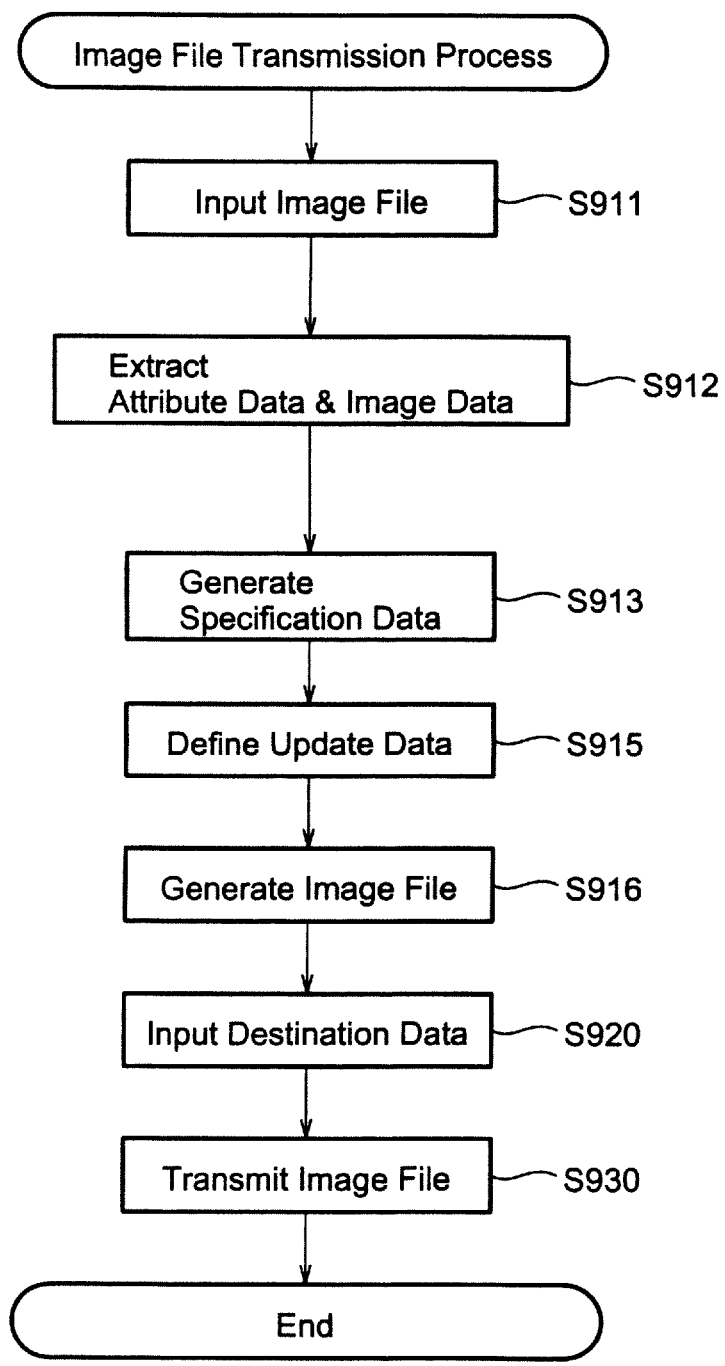
FIG. 19 is a flowchart of the image file transmission process.

FIG. 19 is a flowchart of the image file transmission process. The IFT server 90 inputs the image file (Step S911) and extracts the image data and the attribute data (Step 912). The IFT server 90 further extracts the specification data from the attribute data (Step S913) and defines the update data to be used (Step S915).

In this embodiment, the IFT server 90 retrieves the update data from the update data storage module 97, without acquiring the update data from outer devices or other servers. The IFT server 90, then, generates the modified image file with the update data and the image data (Step S916). Subsequently, the IFT server 90 inputs the destination data (Step S920), and transmits the image data to the destination according to the destination data (Step S930).

The IFT server 90 of this embodiment can edit and transmit the image file, which allows the user to use the PIM or the update data to edit the image file without complicated instructions.

In this embodiment, the PIM may be set according to the type of printer 11 being used. In this case, the IFT server 90 stores the update data in the mapping of the types of printers 11. The IFT server 90 specifies the type of the printer 11 based on the specification data sent from the DSC 10. This modification allows the user to use the appropriate PIM according to the type of the printer 11 without increasing the complexity of the process. And makers of the printer 11 can easily provide the PIMs for various types of printers.

The above embodiments and modifications thereof are to be considered in all aspects as illustrative and not restrictive. There may be many modifications, changes, and alterations without departing from the scope or spirit of the main characteristics of the present invention. For example, the diverse control processes discussed above may be attained by hardware structures, instead of software configurations.

The scope and spirit of the present invention are indicated by the appended claims, and should not be restricted unnecessarily by the foregoing description.

What is claimed is:

1. A digital camera, comprising:
    an image data generating module configured to generate image data of an image captured by the digital camera;
    a display device configured to display a user interface screen to enable a user to select an image control mode;
    an image control data generating module configured to generate image control data to be used for image processing of the image data, the image control data being generated in accordance with the selected image control mode; and
    a memory management module configured to acquire the image control data from an external memory device separate from the digital camera.

2. The digital camera according to claim 1, wherein the display device displays plural sets of image control data including first image control data stored in the digital camera in advance and second image control data acquired additionally from the external memory.

3. The digital camera according to claim 2, wherein the memory management module acquires the second image control data from a data server.

4. A digital camera, comprising:
    an image data generating module configured to generate image data of a captured image;
    a display device configured to display a user interface screen to enable a user to select an image control mode;
    an image control data attaching module configured to attach image control data to the image data, the image control data to be used for image processing of the image data, and the image control data being attached in accordance with the selected image control mode; and
    a memory management module configured to acquire the image control data from an external memory device separate from the digital camera.

5. The digital camera according to claim 4, wherein the memory management module stores the image control data acquired from the external memory device in the digital camera.

6. The digital camera according to claim 5, wherein the display device displays the image control data stored in the digital camera.

7. The digital camera according to claim 4, wherein the memory management module acquires the image control data from a data server.

8. The digital camera according to claim 7, wherein the memory management module stores the image control data acquired from the data server in the digital camera.

9. The digital camera according to claim 8, wherein the display device displays the image control data stored in the digital camera.

* * * * *